(12) United States Patent
Logue et al.

(10) Patent No.: US 9,672,260 B2
(45) Date of Patent: Jun. 6, 2017

(54) SYSTEMS AND METHODS FOR UPDATING DATA ACROSS MULTIPLE NETWORK ARCHITECTURES

(71) Applicant: Google Inc., Mountain View, CA (US)

(72) Inventors: Jay D. Logue, San Jose, CA (US); Zachary B. Smith, San Francisco, CA (US); Matthew G. Neeley, San Mateo, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 14/508,884

(22) Filed: Oct. 7, 2014

(65) Prior Publication Data

US 2016/0098468 A1    Apr. 7, 2016

(51) Int. Cl.
| | |
|---|---|
| *G06F 17/30* | (2006.01) |
| *H04L 12/24* | (2006.01) |
| *H04L 12/28* | (2006.01) |
| *G06F 17/22* | (2006.01) |
| *H04L 29/08* | (2006.01) |

(52) U.S. Cl.
CPC .. *G06F 17/30569* (2013.01); *G06F 17/30312* (2013.01); *H04L 12/2825* (2013.01); *H04L 41/04* (2013.01); *H04L 67/10* (2013.01); *G06F 17/2247* (2013.01); *G06F 17/2264* (2013.01); *G06F 17/30082* (2013.01); *G06F 17/30914* (2013.01); *H04L 67/02* (2013.01); *H04L 2012/285* (2013.01)

(58) Field of Classification Search
CPC ............. G06F 17/2247; G06F 21/6236; G06F 17/2264; G06F 17/30082; G06F 17/30914; H04L 67/02; H04L 67/10; H04L 12/2803

USPC ................................ 707/756, 791, 758, 804
See application file for complete search history.

(56) References Cited

U.S. PATENT DOCUMENTS

| | | | |
|---|---|---|---|
| 6,757,739 B1 | 6/2004 | Tomm et al. | |
| 7,873,663 B2 * | 1/2011 | Willis | G06F 17/2247 707/758 |
| 9,294,340 B1 | 3/2016 | Logue et al. | |
| 2005/0060364 A1 * | 3/2005 | Kushwaha | H04L 41/5009 709/200 |

(Continued)

OTHER PUBLICATIONS

"Convert TLV to PHP array", Stack Overflow. Jun. 12, 2013. <http://!stackoverflow.com/questions/17067549/convert-tlv-to-phparray>.p. 1.

(Continued)

*Primary Examiner* — Dangelino Gortayo
(74) *Attorney, Agent, or Firm* — Wolfe-SBMC

(57) ABSTRACT

A method for updating a storage element may include receiving a first set of data from a first device that operating in a structure. The first set of data corresponds to a first data type interpretable by the first device. The method may also include translating the first set of data into a second set of data of a second data type interpretable by a second device operating in the structure but not by the first device. The first set of data and the second set of data are associated with a first portion of information associated with occupancy properties of the structure. The method may then include storing the second set of data in a storage element that includes a second portion information associated with the occupancy properties of the structure.

20 Claims, 13 Drawing Sheets

(56) References Cited

U.S. PATENT DOCUMENTS

| | | | |
|---|---|---|---|
| 2007/0136412 A1* | 6/2007 | Oba | G06F 17/2247 |
| | | | 709/200 |
| 2007/0198742 A1 | 8/2007 | Pak et al. | |
| 2009/0067385 A1 | 3/2009 | Murahari et al. | |
| 2012/0026938 A1* | 2/2012 | Pandey | H04L 43/065 |
| | | | 370/328 |
| 2012/0303824 A1 | 11/2012 | Anderson et al. | |
| 2013/0246944 A1* | 9/2013 | Pandiyan | G06F 9/54 |
| | | | 715/760 |
| 2014/0244692 A1* | 8/2014 | Williamson | G06F 17/30923 |
| | | | 707/791 |
| 2015/0052253 A1* | 2/2015 | Johnson | H04L 61/1511 |
| | | | 709/226 |
| 2016/0028688 A1* | 1/2016 | Chizhov | G06Q 10/10 |
| | | | 726/12 |
| 2016/0041894 A1* | 2/2016 | Reid, III | G06F 11/3636 |
| | | | 714/45 |
| 2016/0099826 A1 | 4/2016 | Logue et al. | |

OTHER PUBLICATIONS

Shahzad, Nabeel. "S.IM.PL Serialization: Type System Scopes Encapsulate Cross-Language, Multi-Format Information Binding." Dec. 2011, Texas A&M University. pp. 1-174.

"Final Office Action", U.S. Appl. No. 14/542,019, Aug. 10, 2015, 9 pages.

"First Action Interview Office Action", U.S. Appl. No. 14/542,019, May 18, 2015, 5 pages.

"Notice of Allowance", U.S. Appl. No. 14/542,019, Nov. 12, 2015, 8 pages.

"Pre-Interview First Office Action", U.S. Appl. No. 14/542,019, Mar. 13, 2015, 5 pages.

\* cited by examiner

SYSTEMS AND METHODS FOR UPDATING DATA ACROSS MULTIPLE NETWORK ARCHITECTURES

BACKGROUND

The present disclosure relates generally to converting data for use across multiple network architectures. More specifically, the present disclosure relates generally to converting different types of data received by multiple network architectures into one uniform format, such that the data from all of the multiple network architectures may be interpreted together.

Network-connected devices appear throughout homes. Some devices are often capable of communicating with each other through a single network type (e.g., WiFi connection) using one type of transfer protocol, while other devices communicate with each other through another network type using a different type of transfer protocol. Since different devices disposed in the same home may be connected to different protocols, each device in the home may not be able to communicate with all of the devices in the home.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for updating a storage element may include receiving a first set of data from a first set of devices that operates within a home environment. The first set of data corresponds to a first data type. The method may also include translating the first set of data into a second set of data having a second data type, such that the second data type is interpretable by a second set of devices that operates within the home environment. The method may then include storing the second set of data in the storage element.

In another embodiment, a system may include a first set of devices that communicates with each other using a tag-length-field (TLV) data format and a second set of devices that communicates with each other using a JavaScript Object Notation (JSON) data format. The first and second set of devices control or monitor conditions in a home environment. The system may also include a storage element that stores information associated with the first and second sets of devices in the JSON data format. The system may also include a cloud-computing device that updates the storage element by receiving a first set of data from the first set of devices, translating the first set of data into a second set of data having the JSON data format, and storing the second set of data in the storage element.

In yet another embodiment, a non-transitory computer-readable medium may include instructions to receive JavaScript Object Notation (JSON) format data from a first device that monitors or controls a first condition in a home or office environment and receive tag-length-value (TLV) format data from a second device that monitors or controls a second condition in the home or office environment. The instructions may then update a first bucket in a storage element based on the JSON format data, translate the TLV-format data into an equivalent JSON format data, and update a second bucket in the storage element based on the equivalent format data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
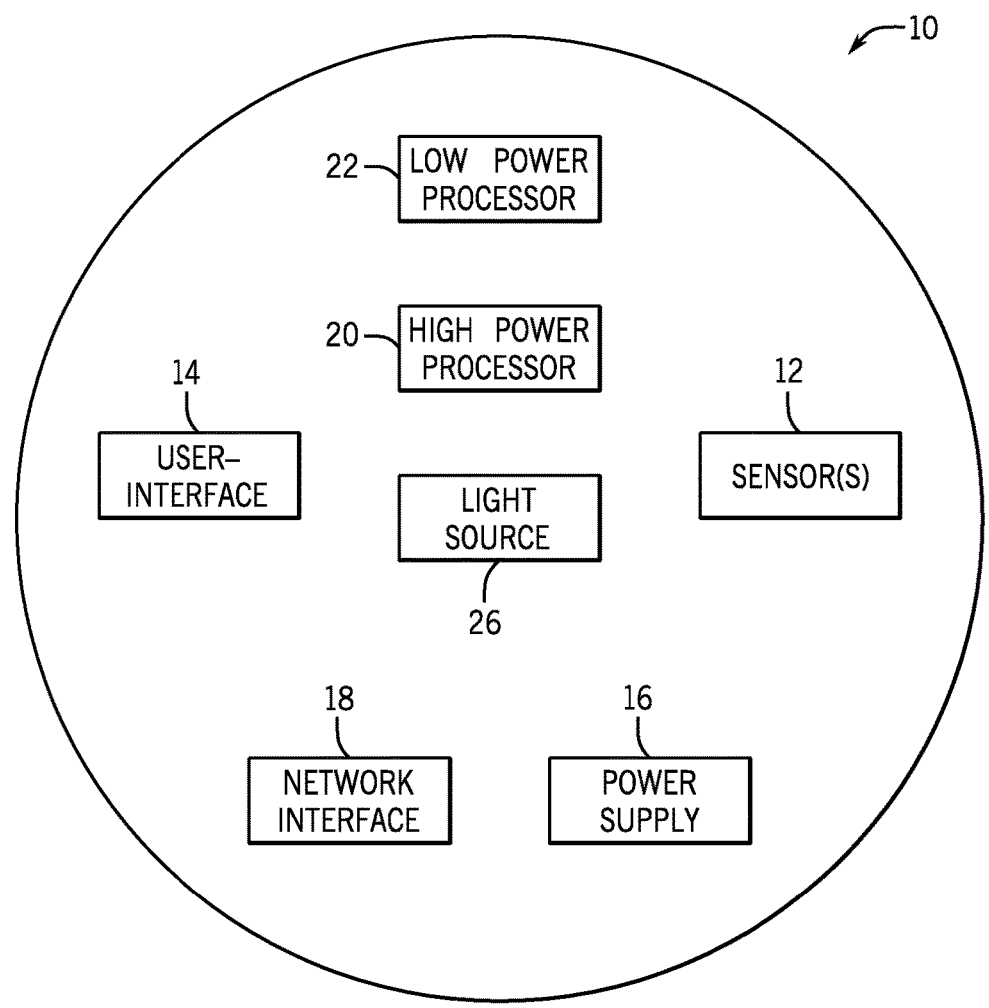
FIG. 1 illustrates a block diagram of a general device that may control and/or monitor a building environment, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments disclosed herein are related to storing data received from various devices in a smart-home environment in one format, such that the data may be analyzed or interpreted consistently by each device or by some other entity (e.g., cloud service). Generally, some devices may send updates to a cloud-based service or a cloud-computing system in a JavaScript Object Notation (JSON) format. The JSON-format data may identify a particular bucket of a database accessible by the cloud-based service to update. The JSON-format data may also indicate a new value to update the identified bucket of the database. As a result, the cloud-computing system may store data received from various devices in an organized fashion, such that the stored data may be easily retrieved, analyzed, processed, and the like.

Although certain devices may communicate with the cloud-computing system using JSON-format data, other devices may communicate using tag-length-value (TLV) format data, which may be communicated in a more efficient manner as compared to JSON-format data. As such, to update a database that stores JSON-format data, the cloud-computing system may translate the received TLV-format data into an equivalent JSON-format data and update a corresponding bucket in the database using the equivalent JSON-format data. As a result, the database may be accurately updated to include a status or state of each type of JSON-enabled device and TLV-enabled device.

Smart Device in Smart Home Environment

By way of introduction, FIG. 1 illustrates an example of a general device 10 that may that may be disposed within a building environment. In one embodiment, the device 10 may include one or more sensors 12, a user-interface component 14, a power supply 16 (e.g., including a power connection and/or battery), a network interface 18, a high-power processor 20, a low-power processor 22, a light source 26, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices, servers, routers, and the like. As such, the network interface 18 may enable the device 10 to communicate with other devices 10 or communication-capable components via a wired or wireless network. The network interface 18 may include a wireless card or some other transceiver connection to facilitate this communication. In any case, the network interface 18 may be capable of communicating with a cloud-computing system that may receive data from a variety of different types of devices 10, each of which may communicate using a different communication protocol. As will be appreciated, the cloud-computing system may include certain components that enable it to translate the data received from each different type of device into one data format. Additional details regarding the translation of data by the cloud-computing device will be described below.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. In one embodiment, the low-power processor may wake or initialize the high-power processor for computationally intensive processes.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In some instances, the high-power processor 20 may predict desirable settings and/or implement those settings. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

In addition to detecting various types of events, the device 10 may include a light source 26 that may illuminate when a living being, such as a human, is detected as approaching. The light source 26 may include any type of light source such as one or more light-emitting diodes or the like. The light source 26 may be communicatively coupled to the high-power processor 20 and the low-power processor 22, which may provide a signal to cause the light source 26 to illuminate.

Figure 2:
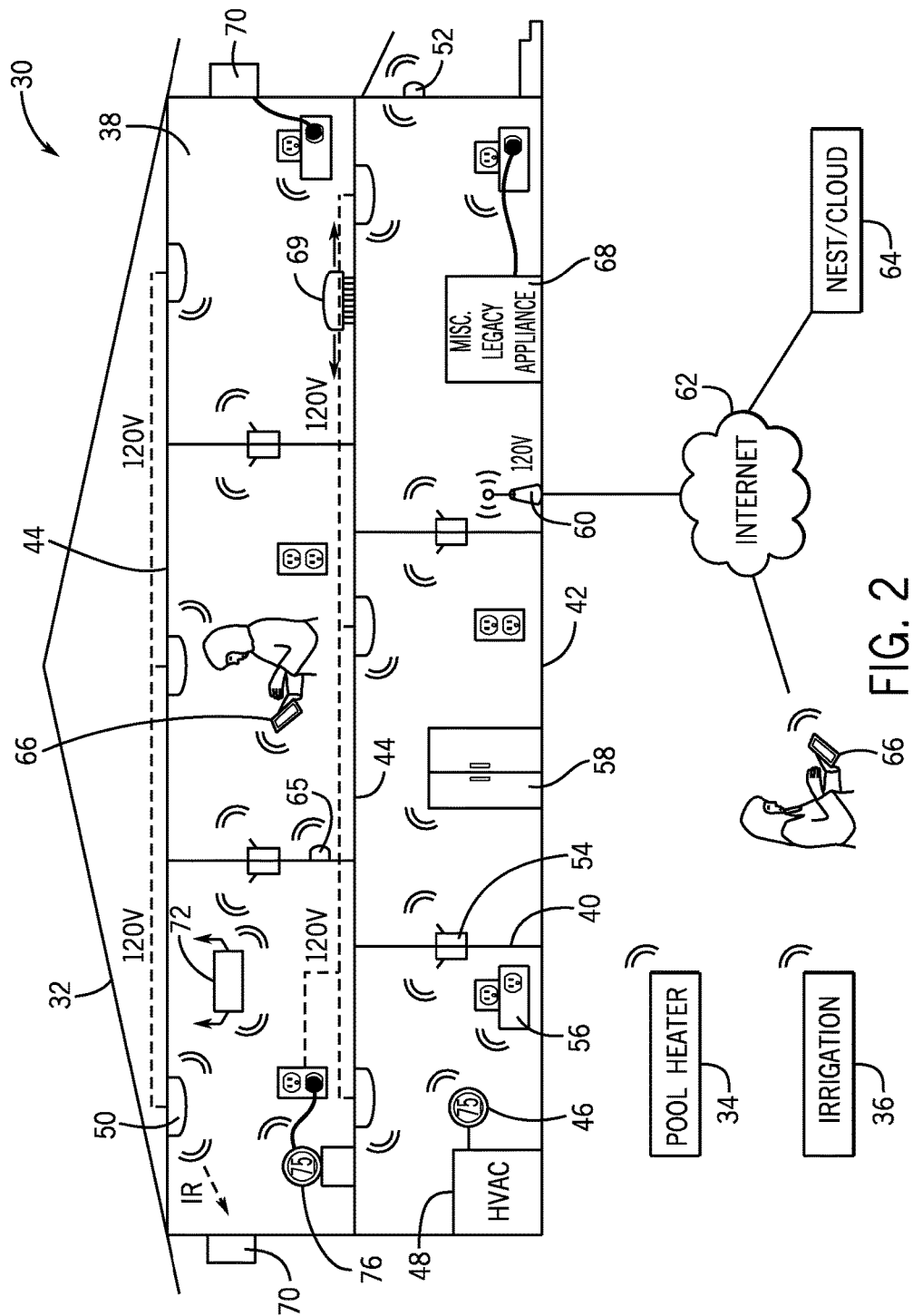
FIG. 2 illustrates a block diagram of a smart-home environment in which the general device of FIG. 1 may communicate with other devices via a network layer protocol, in accordance with an embodiment.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dew point, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current set point temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the homeowner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the homeowner is asked if they want to enable a Local Web App (LWA) on the smart device. Business owners will likely say no; homeowners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals). In certain embodiments, the cloud-computing system 64 may receive data from each of the devices within the smart-home environment 30, such that the data regarding the smart-home environment 60 may be stored remotely, analyzed, shared with certain service providers, and the like.

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night-light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night-light 65 is configured to activate the light source when its ambient light sensor detects that the room is dark and when its occupancy sensor detects that someone is in the room. In other embodiments, the smart night-light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night-light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" set point temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
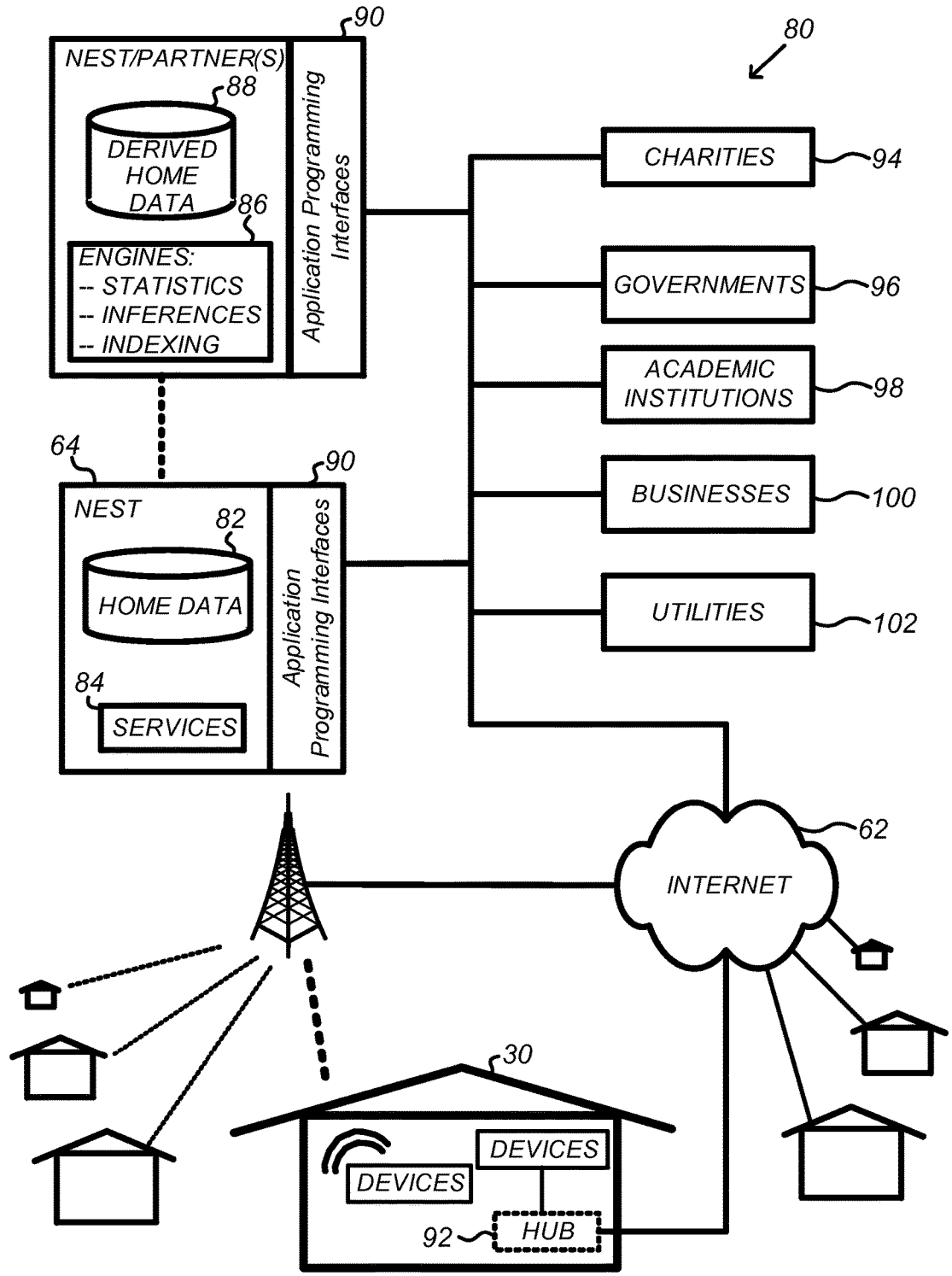
FIG. 3 illustrates a network-level view of an extensible devices and services platform with which the smart-home environment of FIG. 2 can be integrated, in accordance with an embodiment.

In addition, FIG. 3 illustrates an embodiment of an extensible devices and services platform 80 that can be concentrated at a single server or distributed among several different computing (e.g., cloud-computing system 64) entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing system 64 makes inferences about water usage in the home and provides related services. For example, the central server or cloud-computing system 64 can run programs/algorithms that recognize what water sounds like and when it is running in the home. According to one embodiment, to map the various water sources of the home, upon detecting running water, the central server or cloud-computing system 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing system 64 will know that the water usage at that time is associated with that toilet. Thus, the central server or cloud-computing system 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing system 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing system 64 can determine the "signatures" of particular types of pests.

For example, in the event the central server or cloud-computing system 64 detects sounds that may be associated with pests, it notifies the occupants of such sounds and suggests hiring a pest control company. If it is confirmed that pests are indeed present, the occupants input to the central server or cloud-computing system 64 confirms that its detection was correct, along with details regarding the identified pests, such as name, type, description, location, quantity, etc. This enables the central server or cloud-computing system 64 to "tune" itself for better detection and create "signatures" or "fingerprints" for specific types of pests. For example, the central server or cloud-computing system 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing system 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
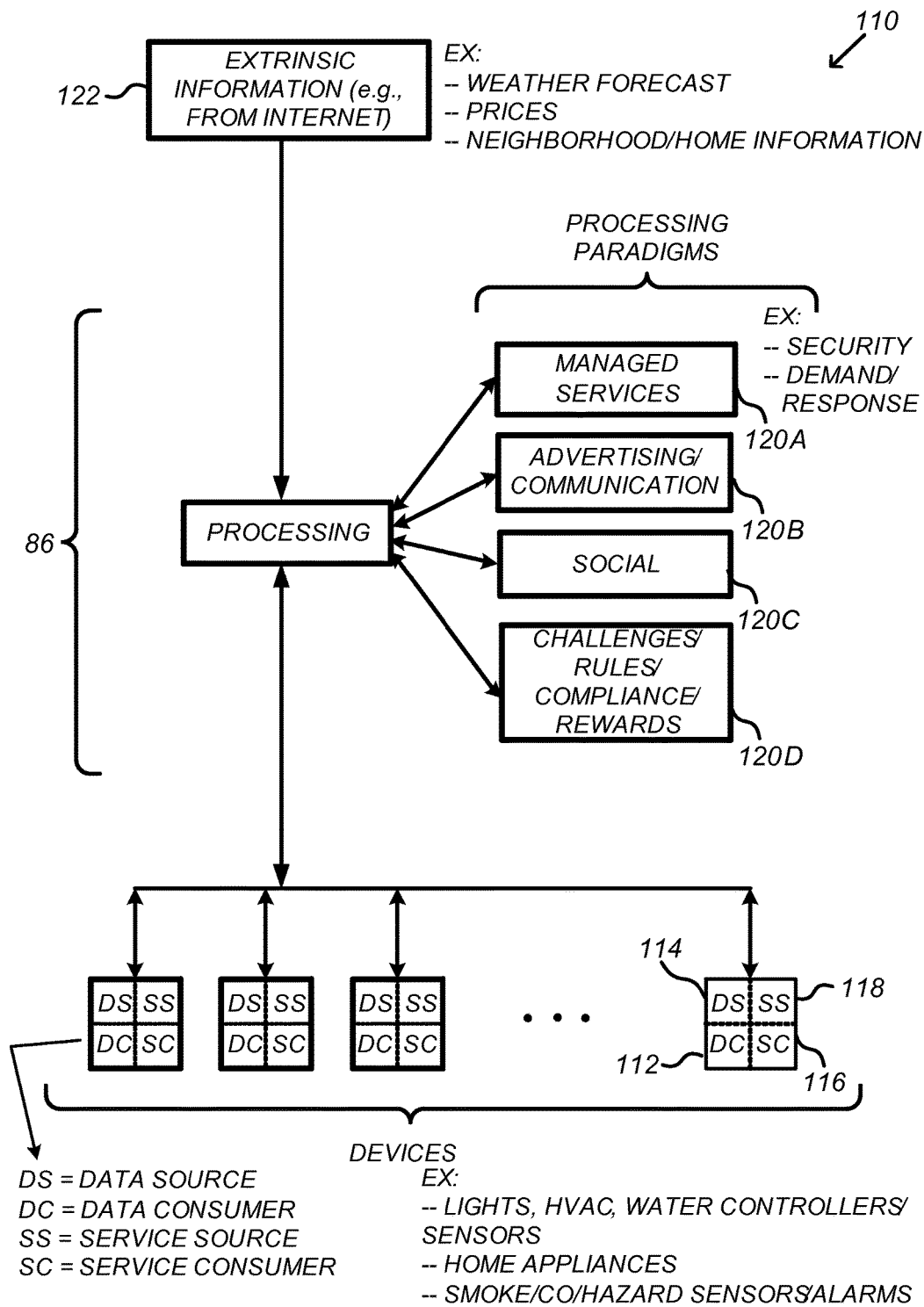
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like.

Device Synchronization Overview

As discussed above, the cloud-computing system 64 may receive data from devices of the smart-home environment 30 for various purposes such as indexing, analysis, generating statistics, and the like. However, since each device 10 sending data to the cloud-computing system 64 may be communicating using a different communication protocol, the data received by the cloud-computing system 64 may be in different formats. To facilitate performing various types of operations on the received data, the cloud-computing system 64 may convert the data received via one type of communication protocol into a format interpretable by another type of communication protocol. In this way, the data acquired by various devices disposed within the smart-home environment 30 may be interpretable, and thus useful, to the cloud-computing device 64.

Figure 5:
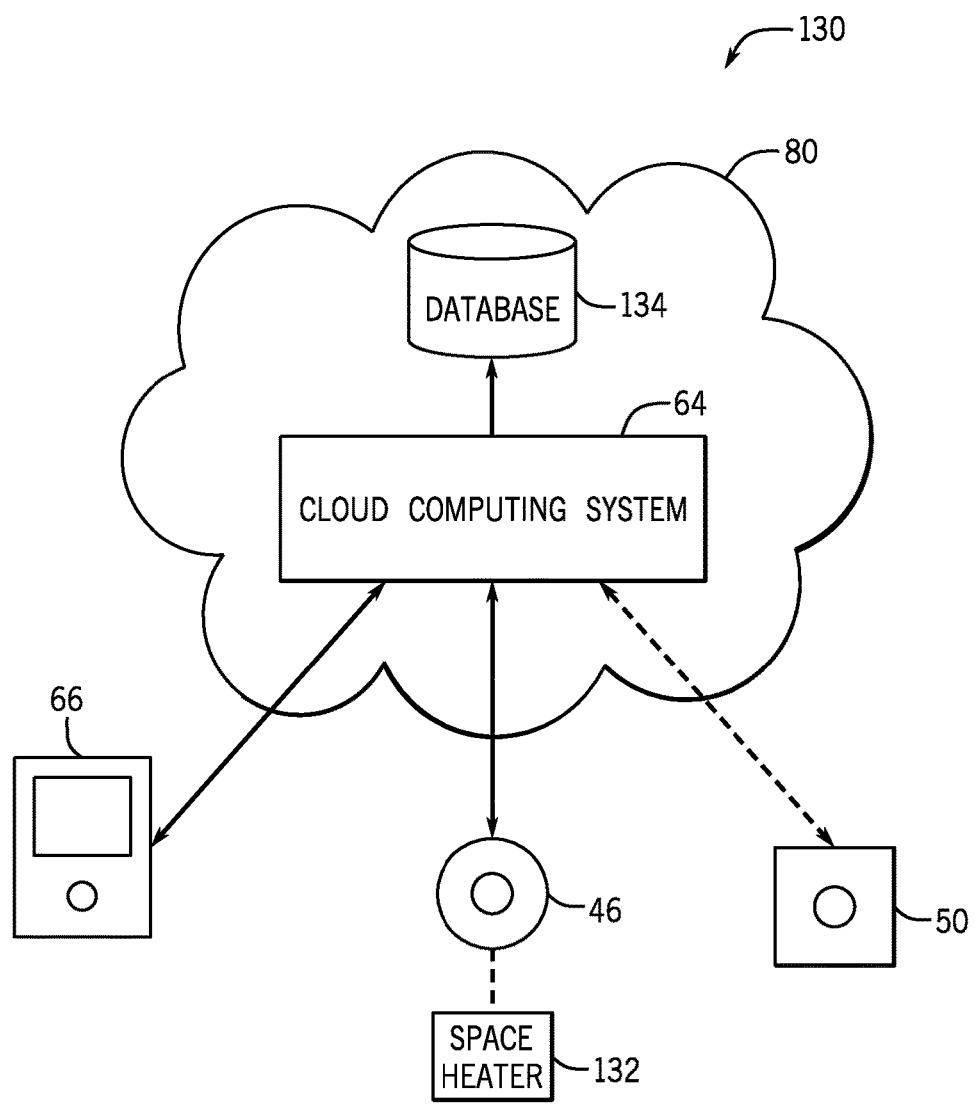
FIG. 5 illustrates a block diagram of communication system used to communicate between various types of devices and a cloud-computing system that may include the extensible devices and services platform of FIG. 3, in accordance with an embodiment.

Keeping this in mind, FIG. 5 illustrates a block diagram of communication system 130 that may facilitate communication between the cloud-computing system 64 and various types of devices disposed in the smart-home environment 30. The cloud-computing system 64 may be part of the extensible devices and services platform 80, which may perform various types of analyses on the data received from the different devices 10 in the smart-home environment 30.

Example devices that communicate with the cloud-computing system 64 may include the portable electronic device (e.g., smartphone) 66, thermostat 46, hazard detector 50, space heater 132, and the like. In certain embodiments, the portable electronic device 66 and the thermostat 46 may communicate with the cloud-computing system 64 using one communication protocol, while the hazard detector 50 may communicate with the cloud-computing system 64 using a different communication protocol. In some cases, the space heater 132 may communicate with just one device such as the thermostat 46. As such, the thermostat 46 may be used as an intermediary to communicate between the cloud-computing system 64 and the space heater 132.

In any case, the cloud-computing system 64 may receive two different types of data via the two different communication protocols. The cloud-computing system 64 may translate one or both of the received data types into one format that may be interpretable by the cloud-computing system 64. That is, the cloud-computing system 64 may translate the received data, such that all of the received data may be analyzed together. Additional details regarding the translation operations performed by the cloud-computing system 64 will be described below.

By way of example, one communication protocol employed by the portable electronic device 66 and the thermostat 46 may be a JavaScript Object Notation-based (JSON-based) protocol that sends data organized as part of information buckets or a data type that groups objects together according to some general field. The JSON format is an open standard format that uses human-readable text to transmit data objects consisting of field-value pairs.

Another example communication protocol that may be used by the hazard detector 50 may include a type-length-value (TLV) protocol. The TLV protocol may correspond to a data communication protocol that encodes data according to a type of data, a length of a value associated with the data, and the value of the data. Generally, the type of the TLV protocol may include a binary code that indicates a type of field that the data represents, the length may include a size of the value field (typically in bytes), and the value may represent a variable-sized series of bytes that contains the data. By sending data in a TLV format, the data may be compactly and flexibly transmitted using low encode/decode and memory overhead, thereby providing an power efficient means of communication.

JSON-Based Communication

Figure 6:
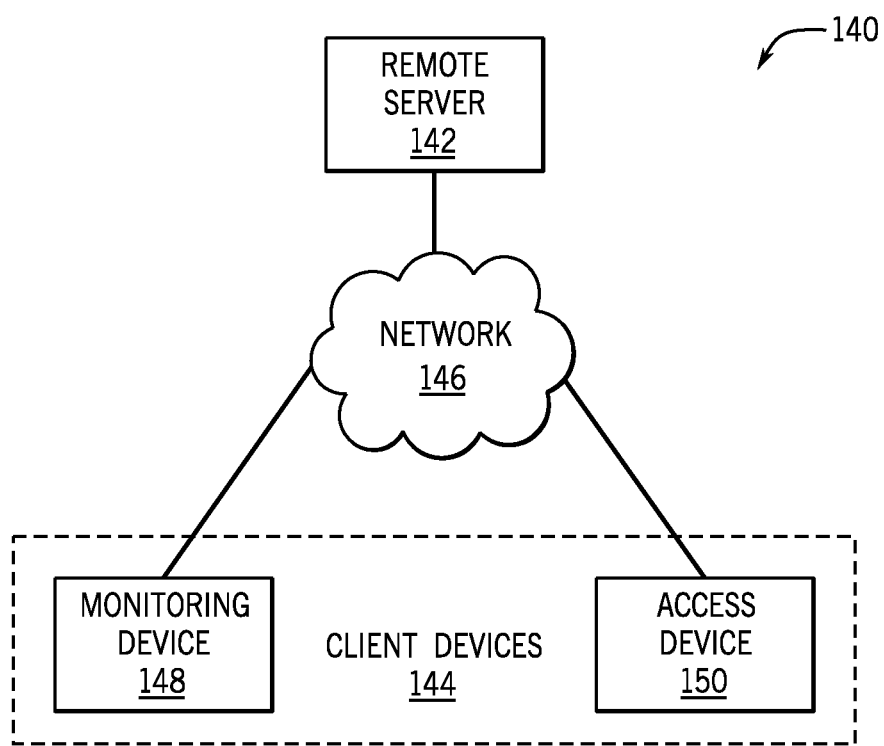
FIG. 6 illustrates an example of a network-based communication system that may use a JavaScript Object Notation (JSON) based communication protocol to communicate between devices in the smart-home environment of FIG. 2, in accordance with an embodiment.

Keeping the foregoing in mind, FIG. 6 illustrates an example of a network-based communication system 140 that may use a JSON-based communication protocol to communicate between a remote server 142 (e.g., cloud-computing system 64) and client devices 144 (e.g., device 10). Referring to FIG. 6, the communication system 140 may be used for various purposes, including, for example, synchronizing states of devices distributed across the system. As such, the communication system 140 includes a remote server 142 that is remote from and communicatively coupled to one or more client devices 144 via a network 146. The client devices 144 may include one or more monitoring devices 148 and one or more access devices 150.

Generally, the monitoring device 148 may be an electronic device operable to generate base data to be shared across the communication system 140. In one embodiment, the monitoring device 148 may generate such base data by monitoring one or more aspects of its environment and using the monitored data as base data. For example, where monitoring device 148 corresponds to the thermostat 46, the monitoring device 148 may include sensors that sense environmental characteristics such as temperature, humidity, occupancy, etc. Such data may thus be generated by monitoring device 148 and communicated to remote server 142. When changes are made at the monitoring device 148, for example, when environmental changes are sensed, those changes may similarly be communicated to remote server 142.

In addition to generating data by monitoring aspects of its environments, data may also be generated by user interaction with the monitoring device 148. For example, where monitoring device 148 corresponds to thermostat 46, a user may define a desired temperature (i.e., a "set point temperature" or more simply "set point") via the monitoring device 148, where the monitoring device 148 may subsequently control an electrically coupled HVAC system to achieve and/or maintain the desired temperature. Or, via algorithms programmed therein, monitoring device 148 themselves may generate a set point. The set point, regardless of how it is generated or altered, and changes thereto, may similarly be communicated to the remote server 142.

Conversely, the remote server 142 may change one or more fields of data associated with the monitoring device 148. For example, the remote server 142 may wish to alter the set point stored at the monitoring device 148. In such case, the remote server 142 may alter its own version of the set point of the monitoring device 148 and communicate that change to the monitoring device 148. Thus, in addition to changes to data made at the monitoring device 148 being reflected at the remote server 142, changes to data made at the remote server 142 are reflected at the monitoring device 148.

In some embodiments, an access device 150 may also be provided, where the access device 150 can operate to access data from and change data at the monitoring device 148. To access data from the monitoring device 148, the access device 150 may acquire copies of such data from the remote server 142. Since the state of information at the monitoring device 148 and the state of information at the remote server 142 are generally identical, by acquiring the data from the remote server 142 the state of information at the access device 150 is generally identical to that at the monitoring device 148. Further, to change data of the monitoring device 148 (e.g., the set point), a user may cause the change at the access device 150, where the change is propagated to the monitoring device 148 via the remote server 142.

In any case, multiple monitoring devices 148 and access devices 150 may share its information or data with other monitoring devices 148, access devices 150, or the remote server 142 via network 146. The network 146 is any suitable network for enabling communications between various entities, such as between client devices 144 and remote server 142. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. The network 146 may utilize any suitable protocol, and communication over the network 146 may be enabled by wired or wireless connections, and combinations thereof.

It should be noted that the communication system 140 may be a distributed computing environment utilizing several computer systems and components that are interconnected via communication links, using one or more computer networks or direct connections. However, it will be appreciated by those skilled in the art that such a system could operate equally well in a system having fewer or a greater number of components than are illustrated in FIG. 6. Thus, the depiction of system 140 in FIG. 6 should be taken as being illustrative in nature, and not as limiting the scope of the present teachings.

Figure 7:
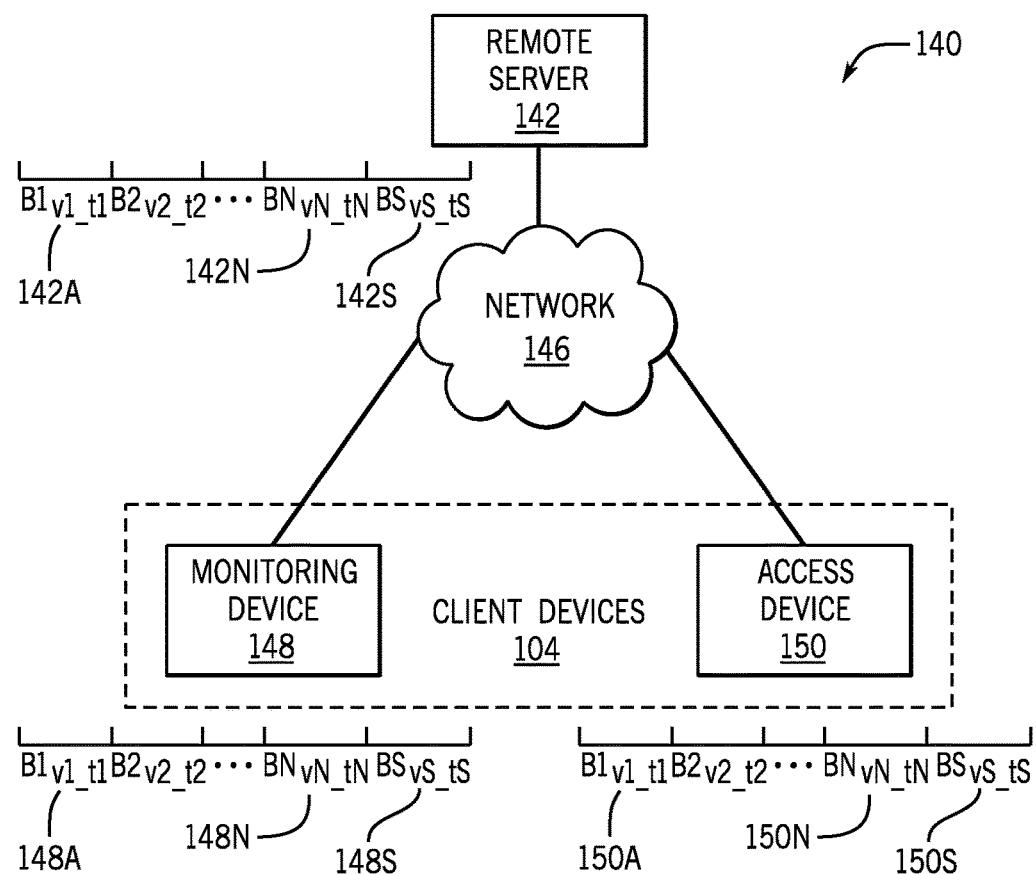
FIG. 7 illustrates the network-based communication system of FIG. 6 together with buckets of information provided at each of the entities of that system, in accordance with an embodiment.

FIG. 7 illustrates the communication system of FIG. 6 together with buckets of information provided at each of the entities of that system according to an embodiment. As mentioned above, the entities of system 140 may store data in a JSON-based format that may take the form of "buckets." Each bucket of information may include a field-value pair.

The fields may be defined for various properties of the monitoring device 148 and/or its environment, while the value may be characteristic associated with each field. For example, the thermostat 46 may include an exemplary field-value pair of:

"hvac_heater_state": 0

The string "hvac_heater_state" is the field, referring to the state of an HVAC heater, and number "0" is the value, referring to the state of the HVAC heater (e.g., off). With this field-value pair example in mind, an exemplary bucket may be as follows:

---

Bucket Name: structure.<id>
{
"devices": [device.<id>, device.<id>]
"name": "My Living Room Thermostat",
"away": false,
"display_location": "Palo Alto,CA\n"
}

---

Referring to the example above, the bucket is called "structure" and includes field-value pairs associated with a structure (e.g., house) in which the monitoring device 148 is located. With reference to FIG. 7, the "structure" bucket may be bucket "B1" 148A that includes values initially defined at the monitoring device 148. Each bucket may be provided with a version identifier and/or a timestamp. The version identifier uniquely identifies a version of the bucket, whereas the timestamp identifies a time at which a bucket (or value therein) was received or generated by server 142. Thus, with reference once again to FIG. 7, the bucket "B1" may be associated with a unique version "v1" and timestamp "t1" that are received from server 142.

The monitoring device 148 may have a plurality of buckets, "B1" 148A through "BN" 148N, where each bucket includes its own set of field-value pairs. The remote server 142 may also have a plurality of buckets, "B1" 142A through "BN" 142N, that respectively correspond to the buckets of the monitoring device 148. As such, when in steady state, the contents of the buckets at the remote server 142 and the corresponding buckets at the monitoring device 148 will be identical. In embodiments where version identifiers and/or timestamps are used, the version identifiers and/or timestamps of the buckets at the remote server 142 and the corresponding buckets at the monitoring device 148 will similarly be identical.

As described, in some embodiments, the communication system 140 includes one or more access devices 150. The access device 150 similarly includes buckets "B1" 150A through "BN" 150N that respectively correspond to the buckets of the monitoring device 148. When in steady state, the contents of the buckets at the access device 150 and the corresponding buckets at each of the remote server 142 and the monitoring device 148 will be identical. In embodiments where version identifiers and/or timestamps are used, the version identifiers and/or timestamps of the buckets at the access device 150 will similarly be identical to those at the remote server 142 and the monitoring device 148.

In at least one embodiment, a plurality of monitoring devices 148 all associated with a same structure or user account may be provided. Each monitoring device 148 includes its unique set of buckets B1 through BN (where N may be the same or different for across the devices 148) that are synchronized with the remote server 142 and, in some cases with the access device 150. Further, some or all of the monitoring devices 148 may include a shared bucket "BS" 148S. The shared bucket BS is like other buckets, but also may be shared or otherwise synchronized among multiple monitoring devices 148 associated with the same structure or user account. To facilitate such sharing, the remote server 142 may also include the shared bucket "BS" 142S for each monitoring device 148. When one monitoring device 148 makes changes to its shared bucket "BS", the remote server 142 may propagate those changes to the other monitoring devices 148. In this fashion, monitoring devices 148 may effectively communicate with one another.

An access device 150 may also include a shared bucket "BS" 150S. In at least one embodiment, the access device 150 includes the shared bucket "BS" of all monitoring devices 148. In this fashion, the access device 150 may be operable to access the buckets of information that are shared across multiple monitoring devices 148. Further details and examples of shared buckets are described in U.S. Prov. Ser. No. 61/627,996 filed Oct. 21, 2011 and as described in U.S. Ser. No. 13/624,892, entitled "Subscription-Notification Mechanisms for Synchronization of Distributed States," which are both incorporated by reference. One such example includes so-called away-state flags, each corresponding to a distinct occupancy-sensing device in a home, each being set to an "away ready" state by the corresponding device if it has not detected occupancy for a predetermined time interval, wherein no one device will enter into an actual away state (a low energy-usage state) until all of the flags are set to "away-ready." For the exemplary case of occupancy-sensing thermostats this will ensure that none of the thermostats will enter into a less comfortable low energy-usage state until all of the devices have "seen" the requisite non-occupancy condition, thereby establishing a high probability that the home is truly unoccupied.

Figure 8:
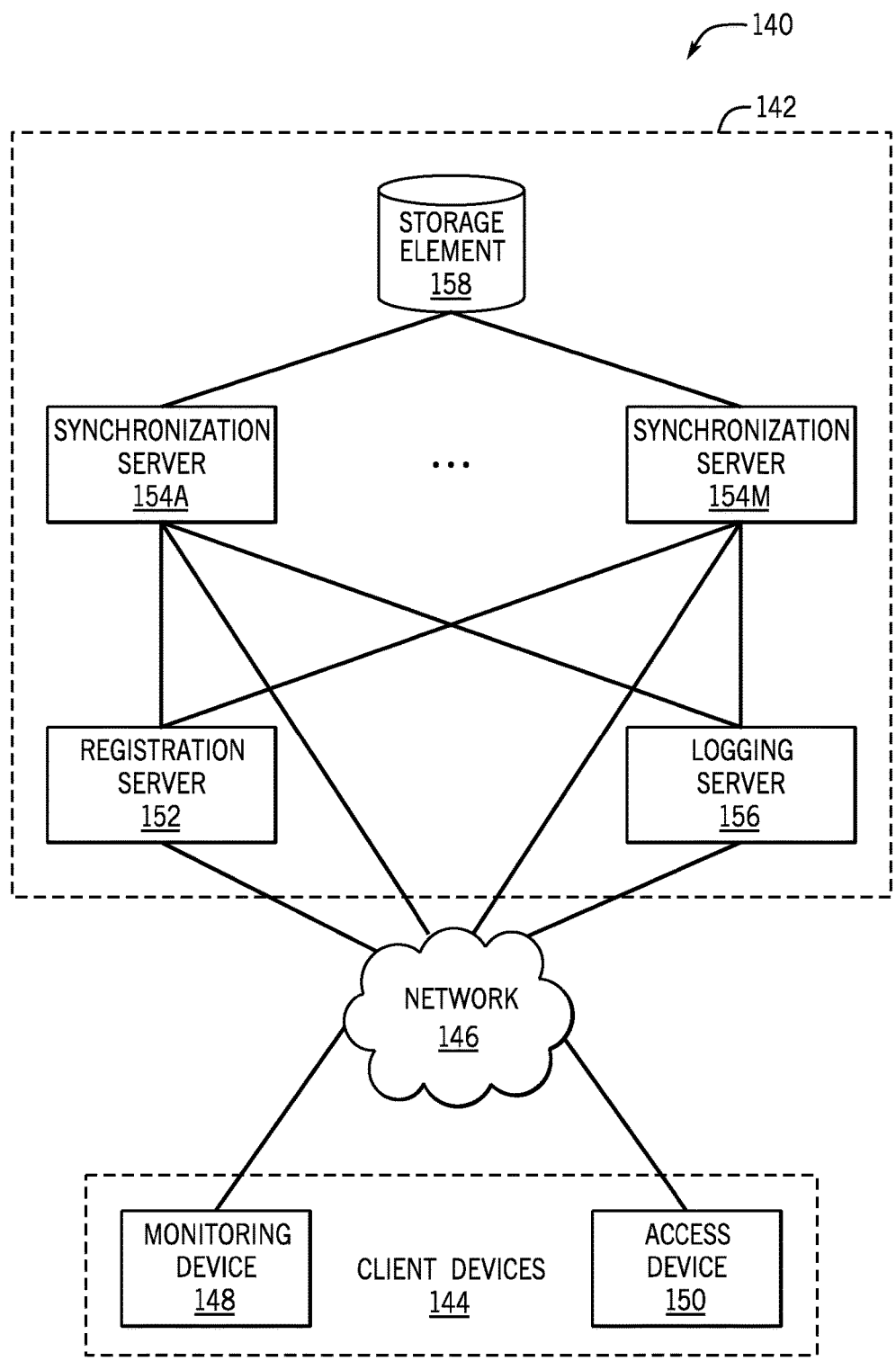
FIG. 8 illustrates the network-based communication system of FIG. 6 with some simplified components of a remote server, in accordance with an embodiment.

FIG. 8 illustrates the system of FIG. 6 including some simplified components of the remote server 142 according to an embodiment. Like numbered entities are identical to those previous described, and thus further description is omitted. Remote server 142 includes a registration server 152, a plurality of synchronization servers 154A through 154M, a logging server 156, and a storage element 158. The registration server 152, synchronization servers 154A through 154M, and logging server 156 are communicatively coupled to the client devices 144 via network 146. The synchronization servers 154A through 154M are also communicatively coupled to the registration server 152 and the storage element 158.

As further described in more detail herein, the storage element 158 may store a variety of information such as buckets 142A through 142N and 142S for all users of the communication system 140. For example, with reference to FIG. 7, for each user of the communication system 150 the storage element 158 may store all of the buckets 142A through 142N and any shared buckets 142S. The registration server 152 and synchronization servers 154A through 154M may then operate to ensure that the state of the buckets in the storage element 158 is identical to the state of the buckets in the associated client devices 144. The storage element 158 may also or alternatively store authentication-related information. For example, the storage element 158 may store assigned credentials, default credentials, etc.

In some embodiments and as further described herein, the registration server 152 acts as a first point of contact for the client devices 144. For example, a monitoring device 148 may have a location identifier (e.g., a URL) of the registration server 152 hardcoded therein so that on initialization or reconnect the monitoring device 148 may always contact registration server 152. Among other things, the registration server 152 may identify one of the synchronization servers 154A through 154M, which is responsible for synchronizing the buckets at the client devices 144 with the buckets at the storage element 158, and provide the identity of the selected synchronization server to the client devices 144. The client devices 144 may then subsequently connect to the selected synchronization server, which will subsequently synchronize the states of the client devices 144 with each other (when, e.g., the client devices 144 are associated with one another such as being paired to the same user account) and with the storage element 158.

As shown above, the communication between the client devices 144 and the remote server 142 may enable the client devices 144 and the remote server 142 to share information that may be useful in determining how to manage the condition of the smart-home environment 30. Moreover, when sharing the data between the client devices 144 and the remote server 142, it is useful that the data is sent and stored by the client devices 144 and the remote server 142 in a format that is interpretable by the client devices 144 and the remote server 142. Here, the client devices 144 and the remote server 142 both use data configured in the bucket format described above.

Figure 9:
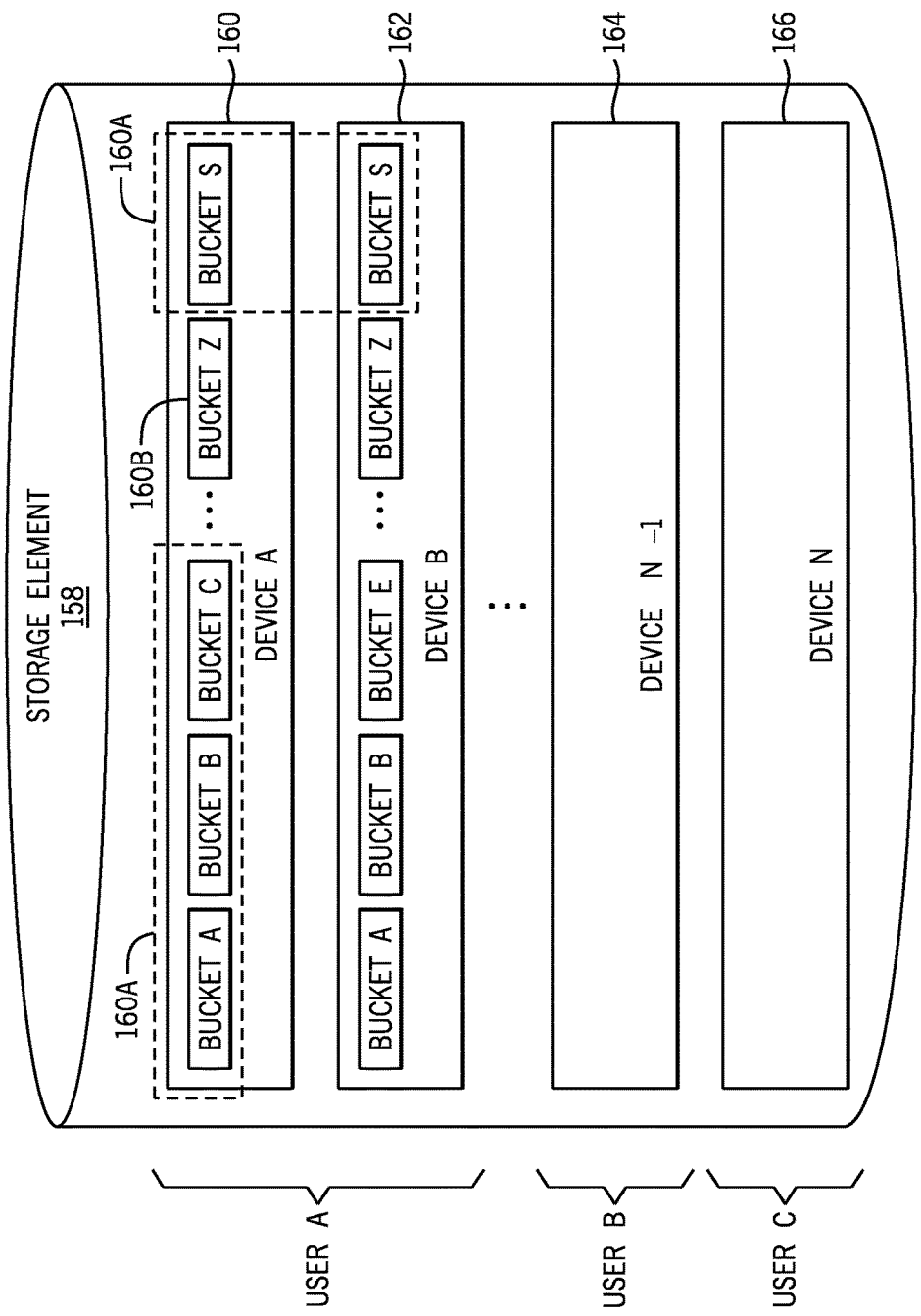
FIG. 9 illustrates example buckets of information that may be part of a storage element in the remote server depicted in FIG. 8, in accordance with an embodiment.

In certain embodiments, the data received from the client devices 144 may be stored by the remote server 142 in the storage element 158. FIG. 9 illustrates example buckets of information that may be part of the storage element 158. For example, the storage element 158 may include, for each client device 144, a plurality of buckets that corresponds to the data received from each client device 144. For a client device 144, "Device A," the storage element 158 includes buckets 190, which include "Bucket A," "Bucket B," "Bucket C," "Bucket Z," and "BucketS." Device A may be paired to, or otherwise associated with, a user account for "User A." In this particular example, User A is associated with two devices, Device A and Device B. Storage element 158 includes buckets 160 associated with Device A, and includes buckets 162 associated with Device B. Other users, such as User B and User C, are associated with other buckets 164 and 166. BucketS in this example is a bucket that is shared between Device A and Device B.

In certain embodiments, the buckets described above may be defined according to a JSON protocol. As such, the remote server 142 may update a particular bucket in the storage element 158 to include the data acquired from the client devices 144 in a JSON format. Since the data stored in the storage element 158 corresponds to one format (e.g., JSON), the remote server 142 may perform various types of analyses on the aggregate data received from all of the client devices 144 to determine certain modifications for the respective client devices 144 and the like.

TLV-Based Communication

Although certain devices may communicate using the buckets of information and the JSON-based protocol described above, in some embodiments, other devices may communicate using a TLV-based protocol mentioned above. As such, these other devices may send data to the remote server 142 in a TLV format. To ensure that the data received from these other devices are interpretable by the remote server 142 or by any other device that analyzes the data, the remote server 142 may translate the TLV-format data into a JSON-format that provides a corresponding bucket for the TLV-format data. In the same manner, the remote server 142 may send data to each respective device according to a format that is interpretable by the respective device.

With this in mind, communicating using the TLV-format may enable devices to efficiently communication through a fabric network of devices in a home environment or similar environment. For example, the TLV-format communication may balance power and reliability concerns regarding the communication, may efficiently communicate messages to certain preferred networks by analyzing Internet Protocol version 6 (IPv6) packet headers that use an Extended Unique Local Address (EULA), may efficiently communicate software updates and status reports throughout a fabric network, and/or may easily and efficiently join a fabric network.

For instance, an electronic device may include memory or storage storing instructions to operate a network stack, a processor to execute the instructions, and a network interface to join a network-connected fabric of devices and communicate a message to a target device of the fabric of devices using the network stack. The network stack may include an application layer to provide an application payload with data to be transmitted in the message, a platform layer to encapsulate the application payload in a general message format of the message, a transport layer to selectably transport the message using either User Datagram Protocol (UDP) or Transmission Control Protocol (TCP), and a network layer to communicate the message using Internet Protocol Version 6 (IPv6) via one or more networks. These networks may include, for example, an 802.11 wireless network, an 802.15.4 wireless network, a powerline network, a cellular network, and/or an Ethernet network. Moreover, the application layer, the platform layer, the transport layer, and/or the network layer may determine a property of the manner of communication of the message to the target node based at least in part on a type of the message, the network over which the message is to be sent, a distance over which the message may travel through the fabric, power consumption behavior of the electronic device, power consumption behavior of the target device, and/or power consumption behavior of an intervening device of the fabric of devices that is to communicate the message between the electronic device and the target device. Further, varying the property of the manner of communication may cause the electronic device, the target device, and/or the intervening device to consume different amounts of power and cause the message to more reliably or less reliably reach the target node.

To effectively and efficiently communicate data between each other within the home environment, the TLV-format devices may use a fabric network that includes one or more logical networks to manage communication between the devices. That is, the efficient fabric network may enable numerous devices within a home to communicate with each other using one or more logical networks. The fabric network may be supported by an efficient communication scheme involving, for example, an efficient network layer, an efficient platform layer, and/or an efficient application layer to manage communication. The fabric network may support Internet Protocol version 6 (IPv6) communication such that each connected device may have a unique local address (ULA). In some examples, the IPv6 communications may employ an Extended Unique Local Address (EULA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

On a relatively lower layer of the communication protocol (e.g., the network layer), the fabric efficient network layer may establish a communication network in which numerous devices within a home may communicate with each other via a wireless mesh network. The communication network may support Internet Protocol version 6 (IPv6) communication such that each connected device may have a unique Internet Protocol (IP) address. Moreover, to enable each device to integrate with a home, it may be useful for each device to communicate within the network using low amounts of power. That is, by enabling devices to communicate using low power, the devices may be placed anywhere in a home without being coupled to a continuous power source.

The efficient network layer may thus establish a procedure in which data may be transferred between two or more devices such that the establishment of the communication network involves little user input, the communication between devices involves little energy, and the communication network, itself, is secure. In one embodiment, the efficient network layer may be an IPv6-based communication network that employs Routing Information Protocol—Next Generation (RIPng) as its routing mechanism and a Datagram Transport Layer Security (DTLS) protocol as its security mechanism. As such, the efficient network layer may provide a simple means for adding or removing devices to a home while protecting the information communicated between the connected devices.

On relatively higher layers of the communication protocol (e.g., the platform and/or application layers), the fabric of devices may be created and maintained. These layers may enable parametric software updates and status reports throughout the fabric. These layers may also provide communication that may be aware of certain network power constraints, such as the power constraints of "sleepy" or battery-powered devices, and may communicate messages with these factors in mind.

Keeping the foregoing in mind, the TLV-format devices may communicate with each other and the remote server 142 using a typical message format that enables the devices to understand communications between the devices regardless of which logical networks the communicating devices are connected to in the fabric. Within the message format, a payload of data may be included for the receiving device to store and/or process. The format and the contents of the payload may vary according to a header within the payload that indicates a profile (including one or more protocols) and/or a type of message that is being sent according to the profile.

According to some embodiments, two or more TLV-format devices in a fabric may communicate using status reporting protocols or profiles. For example, in certain embodiments, a status reporting protocol or schema may be included in a core profile that is available to devices connected to the fabric. Using the status reporting protocol, the TLV-format devices may send or request status information to or from other TLV-format devices in the fabric.

Similarly, in certain embodiments, two or more TLV-format devices in a fabric may communicate using update software protocols or profiles. In some embodiments, the update software protocol or schema may be included in a core profile that is available to TLV-format devices connected to the fabric. Using the update software protocol, the TLV-format devices may request, send, or notify the presence of updates within the fabric.

In certain embodiments, two or more TLV-format devices in a fabric may communicate using data management protocols or profiles. In some embodiments, the data management protocol or schema may be included in a core profile that is available to devices connected to the fabric. Using the update data management protocol, devices may request, view, or track node-resident information that is stored in other devices.

Furthermore, in certain embodiments, two or more TLV-format devices in a fabric may transfer data using bulk data transfer protocols or profiles. In some embodiments, the bulk data transfer protocol or schema may be included in a core profile that is available to devices connected to the fabric. Using the bulk data transfer protocol, devices may initiate, send, or receive bulk data using any logical networks in the fabric. In certain embodiments, either a sending or a receiving device using the bulk data transfer protocol may be able to "drive" a synchronous transfer between the devices. In other embodiments, the bulk transfer may be performed with an asynchronous transfer.

Figure 10:
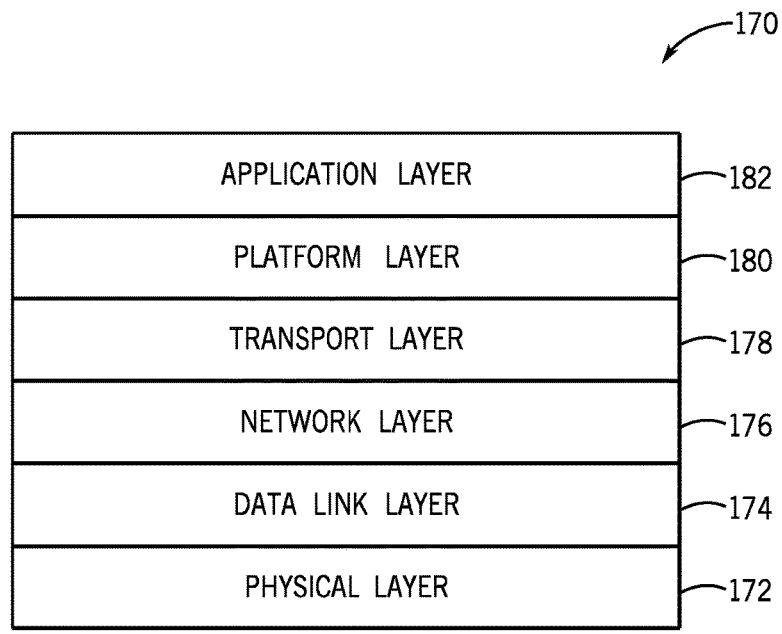
FIG. 10 illustrates a block diagram of an Open Systems Interconnection (OSI) model that depicts functions of a communication system employed by the devices in the smart-home environment of FIG. 2, in accordance with an embodiment.

Generally, the TLV-format devices may communicate with each other using an efficient low-power wireless personal network (ELoWPAN) as described in U.S. Ser. No. 13/926,335, entitled "Efficient Communication for Devices of a Home Network," which is herein incorporated by reference. The ELowPAN may define an efficient network layer that may be part of an Open Systems Interconnection (OSI) model 170 as depicted in FIG. 10. The OSI model 170 illustrates functions of a communication system with respect to abstraction layers. That is, the OSI model may specify a networking framework or how communications between devices may be implemented. In one embodiment, the OSI model may include six layers: a physical layer 172, a data link layer 174, a network layer 176, a transport layer 178, a platform layer 180, and an application layer 182. Generally, each layer in the OSI model 170 may serve the layer above it and may be served by the layer below it. In at least some embodiments, a higher layer may be agnostic to technologies used in lower layers. For example, in certain embodiments, the platform layer 180 may be agnostic to the network type used in the network layer 176.

Keeping this in mind, the physical layer 172 may provide hardware specifications for devices that may communicate with each other. As such, the physical layer 172 may establish how devices may connect to each other, assist in managing how communication resources may be shared between devices, and the like.

The data link layer 174 may specify how data may be transferred between devices. Generally, the data link layer 174 may provide a way in which data packets being transmitted may be encoded and decoded into bits as part of a transmission protocol.

The network layer 176 may specify how the data being transferred to a destination node is routed. The network layer 176 may also provide a security protocol that may maintain the integrity of the data being transferred.

The transport layer 178 may specify a transparent transfer of the data from a source node to a destination node. The transport layer 178 may also control how the transparent transfer of the data remains reliable. As such, the transport layer 178 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 180 may establish connections between devices according to the protocol specified within the transport layer 178. The platform layer 180 may also translate the data packets into a form that the application layer 172 may use. The application layer 172 may support a software application that may directly interface with the user. As such, the application layer 172 may implement protocols defined by the software application. For example, the software application may provide serves such as file transfers, electronic mail, and the like.

Efficient Network Layer

Figure 11:
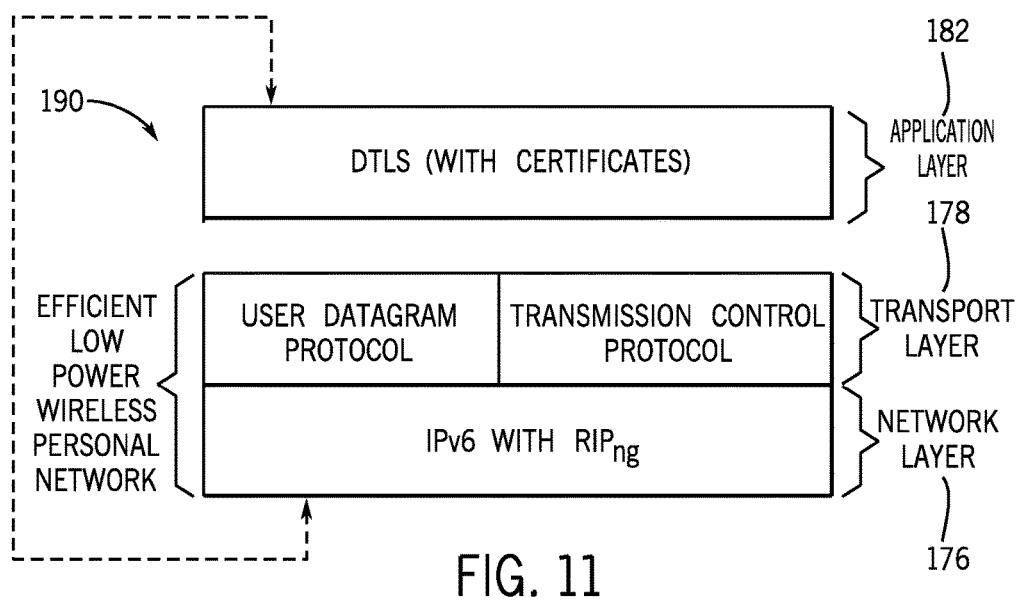
FIG. 11 illustrates a block diagram detailing characteristics of an efficient low power wireless personal network (ELoWPAN) in light of the application layer, transport layer, and network layer of the Open Systems Interconnection (OSI) model of FIG. 10, in accordance with an embodiment.

Referring now to FIG. 11, in one embodiment, the network layer 176 and the transport layer 178 may be configured in a certain manner to form an efficient low power wireless personal network (ELoWPAN) 190. In one embodiment, the ELoWPAN 190 may be based on an IEEE 802.15.4 network, which may correspond to low-rate wireless personal area networks (LR-WPANs). The ELoWPAN 190 may specify that the network layer 176 may route data between the devices 10 in the home environment 30 using a communication protocol based on Internet Protocol version 6 (IPv6). As such, each device 10 may include a 128-bit IPv6 address that may provide each device 10 with a unique address to use to identify itself over the Internet, a local network around the home environment 30, or the like.

In one embodiment, the network layer 176 may specify that data may be routed between devices using Routing Information Protocol-Next Generation (RIPng). RIPng is a routing protocol that routes data via a wireless mesh network based on a number of hops between the source node and the destination node. That is, RIPng may determine a route to the destination node from the source node that employs the least number of hops when determining how the data will be routed. In addition to supporting data transfers via a wireless mesh network, RIPng is capable of supporting IPv6 networking traffic. As such, each device 10 may use a unique IPv6 address to identify itself and a unique IPv6 address to identify a destination node when routing data.

As mentioned above, the network layer 176 may also provide a security protocol that may manage the integrity of the data being transferred. Here, the efficient network layer may secure data transferred between devices using a Datagram Transport Layer Security (DTLS) protocol. Generally, Transport Layer Security (TLS) protocol is commonly used to protect data transfers via the Internet. However, in order for the TLS protocol to be effective, the TLS protocol may transport data using a reliable transport channel such as Transmission Control Protocol (TCP). DTLS provides a similar level of security for transferred data while supporting unreliable transport channels such as User Datagram Protocol (UDP).

The network layer 176 depicted in FIG. 11 is characterized herein as the efficient network layer mentioned above. That is the efficient network layer routes IPv6 data using RIPng and secures the routed data using the DTLS protocol. Since the efficient network layer uses the DTLS protocol to secure data transfer between devices, the transport layer 178 may support TCP and UDP transfer schemes for the data.

Using the above-described ELowPAN 190 and/or any other suitable IPv6 logical networks, efficient platform and/or application layers may be used to generate the fabric of devices in a home environment or similar environments, as mentioned above. The fabric of devices may enable many generally local devices (e.g., TLV-format devices) to communicate, sharing data and information, invoking methods on one another, parametrically providing software updates through the network, and generally communicating messages in an efficient, power-conscious way.

Fabric-Device Interconnection

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee®, ISA100.11a, WirelessHART, MiWi™, power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage.

Fabric Network Connection to Services

Figure 12:
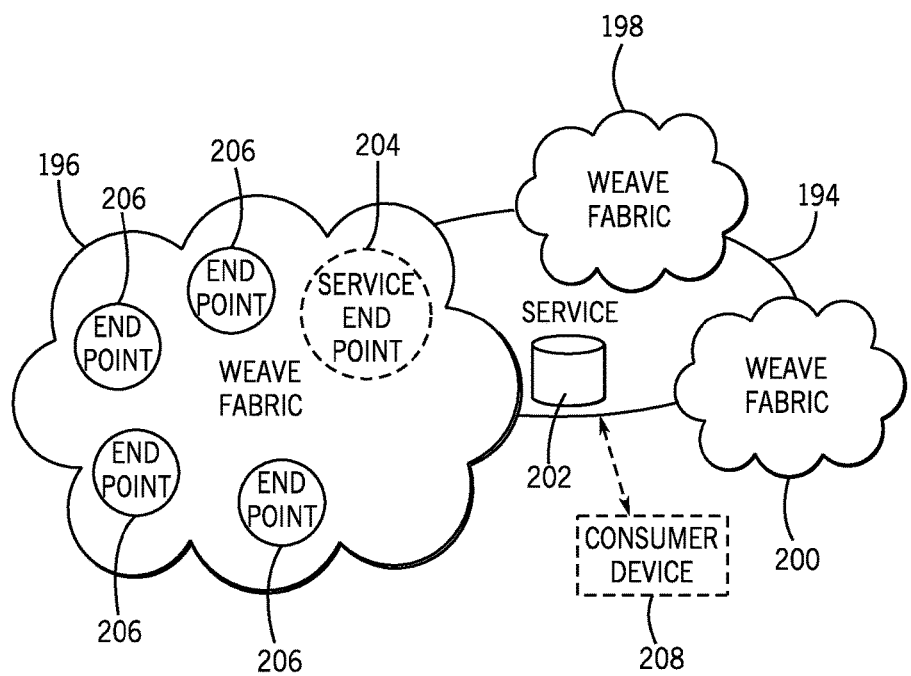
FIG. 12 illustrates a diagram of a service communicating with fabrics of devices via the ELoWPAN communication system of FIG. 11, in accordance with an embodiment.

In addition to communications between devices within the home, a fabric may include services that may be located physically near other devices in the fabric or physically remote from such devices. In certain embodiments, the services may be provided via the remote server 142 described above. The fabric connects to these services through one or more service end points. FIG. 12 illustrates an embodiment of a service 198 communicating with fabrics 196, 198, and 200. The service 194 may include various services that may be used by devices in fabrics 196, 198, and/or 200. For example, in some embodiments, the service 194 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 194 may include a server 202 (e.g., web server) that stores/accesses relevant data and passes the information through a service end point 194 to one or more end points 196 in a fabric, such as fabric 196. Although the illustrated embodiment only includes three fabrics with a single server 202, it should be appreciated that the service 196 may connect to any number of fabrics and may include servers in addition to the server 202 and/or connections to additional services.

In certain embodiments, the service 194 may also connect to a consumer device 208, such as a phone, tablet, and/or computer. The consumer device 208 may be used to connect to the service 194 via a fabric, such as fabric 196, an Internet connection, and/or some other suitable connection method. The consumer device 208 may be used to access data from one or more end points (e.g., electronic devices) in a fabric either directly through the fabric or via the service 194. In other words, using the service 194, the consumer device 208 may be used to access/manage devices in a fabric remotely from the fabric.

Communication Between Devices in a Fabric

Figure 13:
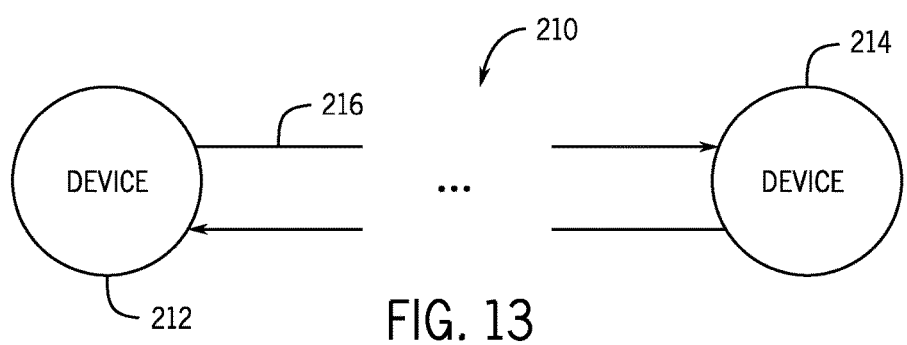
FIG. 13 illustrates an embodiment of a communication between two devices in the smart-home environment of FIG. 2, in accordance with an embodiment.

As discussed above, each electronic device or node may communicate with any other node in the fabric, either directly or indirectly depending upon fabric topology and network connection types. Additionally, some devices (e.g., remote devices) may communicate through a service (e.g., remote server 142) to communicate with other devices in the fabric. FIG. 13 illustrates an embodiment of a communication 210 between two devices 212 and 214. The communication 210 may span one or more networks either directly or indirectly through additional devices and/or services, as described above. Additionally, the communication 210 may occur over an appropriate communication protocol, such as IPv6, using one or more transport protocols. For example, in some embodiments the communication 210 may include using the transmission control protocol (TCP) and/or the user datagram protocol (UDP). In some embodiments, the device 212 may transmit a first signal 216 to the device 214 using a connectionless protocol (e.g., UDP). In certain embodiments, the device 212 may communicate with the device 214 using a connection-oriented protocol (e.g., TCP). Although the illustrated communication 210 is depicted as a bi-directional connection, in some embodiments, the communication 210 may be a uni-directional broadcast.

Data Transmitted in the Fabric

Data passed through the fabric may be arranged in a format common to all messages and/or common to specific types of conversations in the fabric. The message format may correspond to a TLV format mentioned above. In some embodiments, the TLV-format may have a one-to-one mapping to a JSON format to enable the remote server 142 or cloud-computing system 64 to store data received from each device 10 of the smart-home environment 30 in a uniform manner and with respect to corresponding buckets of information. Although the following data frames are described as including specific sizes, it should be noted that lengths of the data fields in the data frames may be varied to other suitable bit-lengths.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting, as mentioned above, may be used to compactly and flexibly encode/ decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), Boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 14:
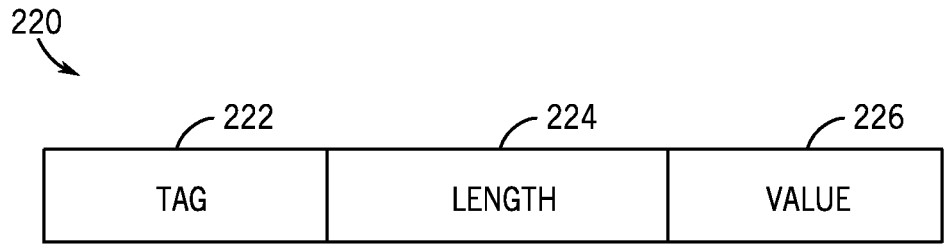
FIG. 14 illustrates a block diagram of an embodiment of a tag-length-value (TLV) packet that may be used in the communication of FIG. 12, in accordance with an embodiment.

As illustrated in FIG. 14, an embodiment of a TLV packet 220 includes three data fields: a tag field 222, a length field 224, and a value field 226. Although the illustrated fields 222, 224, and 226 are illustrated as approximately equivalent in size, the size of each field may be variable and vary in size in relation to each other. In other embodiments, the TLV packet 220 may further include a control byte before the tag field 222.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 224 and value field 226 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte value |
| | | | 0 | 1 | 1 | 0 | 0 | UTF8-String, 1 byte length |
| | | | 0 | 1 | 1 | 0 | 1 | UTF8-String, 2 byte length |
| | | | 0 | 1 | 1 | 1 | 0 | UTF8-String, 4 byte length |
| | | | 0 | 1 | 1 | 1 | 1 | UTF8-String, 8 byte length |

TABLE 1-continued

Example element type field values.

| 7 | 6 | 5 | 4 | 3 | 2 | 1 | 0 | |
|---|---|---|---|---|---|---|---|---|
| | | | 1 | 0 | 0 | 0 | 0 | Byte String, 1 byte length |
| | | | 1 | 0 | 0 | 0 | 1 | Byte String, 2 byte length |
| | | | 1 | 0 | 0 | 1 | 0 | Byte String, 4 byte length |
| | | | 1 | 0 | 0 | 1 | 1 | Byte String, 8 byte length |
| | | | 1 | 0 | 1 | 0 | 0 | Null |
| | | | 1 | 0 | 1 | 0 | 1 | Dictionary |
| | | | 1 | 0 | 1 | 1 | 0 | Array |
| | | | 1 | 0 | 1 | 1 | 1 | Path |
| | | | 1 | 1 | 0 | 0 | 0 | End of Container |

The tag control field indicates a form of the tag in the tag field 222 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 | |
|---|---|---|---|---|---|---|---|---|
| 0 | 0 | 0 | | | | | | Anonymous, 0 bytes |
| 0 | 0 | 1 | | | | | | Context-specific Tag, 1 byte |
| 0 | 1 | 0 | | | | | | Core Profile Tag, 2 bytes |
| 0 | 1 | 1 | | | | | | Core Profile Tag, 4 bytes |
| 1 | 0 | 0 | | | | | | Implicit Profile Tag, 2 bytes |
| 1 | 0 | 1 | | | | | | Implicit Profile Tag, 4 bytes |
| 1 | 1 | 0 | | | | | | Fully-qualified Tag, 6 bytes |
| 1 | 1 | 1 | | | | | | Fully-qualified Tag, 8 bytes |

In other words, in embodiments having a control byte, the control byte may indicate a length of the tag.

In certain embodiments, the tag field 222 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 222 includes a possible three fields: a vendor Id field, a profile Id field, and a tag number field. In the fully qualified form, the encoded tag field 222 includes all three fields with the tag number field including 16 or 32 bits determined by the tag control field. In the implicit form, the tag includes only the tag number, and the vendor Id and profile Id are inferred from the protocol context of the TLV element. The core profile form includes profile-specific tags, as discussed above. Context-specific tags are encoded as a single byte conveying the tag number. Anonymous elements have zero-length tag fields 222.

In some embodiments without a control byte, two bits may indicate a length of the tag field 222, two bits may indicate a length of the length field 224, and four bits may indicate a type of information stored in the value field 226. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | | | 0 | 0 | 0 | 0 | Boolean |
| — | — | | | 0 | 0 | 0 | 1 | Fixed 8-bit Unsigned |
| — | — | | | 0 | 0 | 1 | 0 | Fixed 8-bit Signed |
| — | — | | | 0 | 0 | 1 | 1 | Fixed 16-bit Unsigned |
| — | — | | | 0 | 1 | 0 | 0 | Fixed 16-bit Signed |
| — | — | | | 0 | 1 | 0 | 1 | Fixed 32-bit Unsigned |
| — | — | | | 0 | 1 | 1 | 0 | Fixed 32-bit Signed |
| — | — | | | 0 | 1 | 1 | 1 | Fixed 64-bit Unsigned |
| — | — | | | 1 | 0 | 0 | 0 | Fixed 64-bit Signed |
| — | — | | | 1 | 0 | 0 | 1 | 32-bit Floating Point |
| — | — | | | 1 | 0 | 1 | 0 | 64-bit Floating Point |
| — | — | | | 1 | 0 | 1 | 1 | UTF-8 String |
| — | — | | | 1 | 1 | 0 | 0 | Opaque Data |
| — | — | | | 1 | 1 | 0 | 1 | Container |

As illustrated in Table 3, the upper 8 bits of the tag field 222 may be used to encode information about the tag field 222, length field 224, and the value field 226, such that the tag field 222 may be used to determine length for the tag field 222 and the length fields 224. Remaining bits in the tag field 222 may be made available for user-allocated and/or user-assigned tag values.

The length field 224 may include eight, sixteen, thirty two, or sixty four bits as indicated by the tag field 222 as illustrated in Table 3 or the element field as illustrated in Table 2. Moreover, the length field 224 may include an unsigned integer that represents a length of the encoded in the value field 226. In some embodiments, the length may be selected by a device sending the TLV element. The value field 226 includes the payload data to be decoded, but interpretation of the value field 226 may depend upon the tag length fields, and/or control byte. For example, a TLV packet without a control byte including an 8-bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 222 and the length field 224 each have a length of 8 bits. Additionally, the tag field 222 indicates that the tag type is for the first line is a container (e.g., the TLV packet). The tag field 224 for lines two through six indicate that each entry in the TLV packet has a tag field 222 and length field 224 consisting of 8 bits each. Additionally, the tag field 224 indicates that each entry in the TLV packet has a value field 226 that includes a 32-bit floating point. Each entry in the value field 226 corresponds to a floating number that may be decoded using the corresponding tag field 222 and length field 224 information. As illustrated in this example, each entry in the value field 226 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
    <key>OfflineMode</key>
    <false/>
    <key>Network</key>
    <dict>
        <key>IPv4</key>
        <dict>
            <key>Method</key>
            <string>dhcp</string>
        </dict>
        <key>IPv6</key>
        <dict>
            <key>Method</key>
            <string>auto</string>
```

-continued

```
            </dict>
        </dict>
        <key>Technologies</key>
        <dict>
            <key>wifi</key>
            <dict>
                <key>Enabled</key>
                <true/>
                <key>Devices</key>
                <dict>
                    <key>wifi__18b4300008b027</key>
                    <dict>
                        <key>Enabled</key>
                        <true/>
                    </dict>
                </dict>
                <key>Services</key>
                <array>
                    <string>wifi__18b4300008b027__3939382d33204
                    16c70696e652054657 272616365</string>
                </array>
            </dict>
            <key>802.15.4</key>
            <dict>
                <key>Enabled</key>
                <true/>
                <key>Devices</key>
                <dict>
                    <key>802.15.4__18b43000000002fac4</key>
                    <dict>
                        <key>Enabled</key>
                        <true/>
                    </dict>
                </dict>
                <key>Services</key>
                <array>
                    <string>802.15.4__18b43000000002fac4__3
                    939382d3320416c70696e6520546572</string>
                </array>
            </dict>
        </dict>
    </dict>
    <key>Services</key>
    <dict>
    <key>wifi__18b4300008b027__3939382d3320416c70696e652054657272616365</key>
        <dict>
            <key>Name</key>
            <string>998-3 Alpine Terrace</string>
            <key>SSID</key>
            <data>3939382d3320416c70696e652054657272616365 </data>
            <key>Frequency</key>
            <integer>2462</integer>
            <key>AutoConnect</key>
            <true/>
            <key>Favorite</key>
            <true/>
            <key>Error</key>
            <string/>
            <key>Network</key>
            <dict>
                <key>IPv4</key>
                <dict>
                    <key>DHCP</key>
                    <dict>
                        <key>LastAddress</key>
                        <data>0a02001e</data>
                    </dict>
                </dict>
                <key>IPv6</key>
                <dict/>
            </dict>
        </dict>
        <key>802.15.4__18b43000000002fac4__3939382d3320416c70696e6520546
        572</key>
        <dict>
            <key>Name</key>
            <string>998-3 Alpine Ter</string>
            <key>EPANID</key>
            <data>3939382d3320416c70696e6520546572</data>
```

-continued

```
            <key>Frequency</key>
            <integer>2412</integer>
            <key>AutoConnect</key>
            <true/>
            <key>Favorite</key>
            <true/>
            <key>Error</key>
            <string/>
            <key>Network</key>
            <dict/>
        </dict>
    </dict>
</dict>
</plist>
```

As an example, the above property list may be represented in tags of the above-described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |

TABLE 5-continued

Example representation of the XML Property List in TLV format

| XML Key | Tag Type | Tag Number |
|---|---|---|
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . . " | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x 3c | "wifi_18b43 . . . " | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . . " | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x 3b | "802.15.4_18 . . . " | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . . " | Services.Service.[0].ID |
| 0x4b 0d | 0x14 | "998-3 Alp . . . " | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |

TABLE 6-continued

Example of literal values for tag, length, and value fields for XML Property List

| Tag | Length | Value | Description |
|---|---|---|---|
| 0x4d | 03 | 0x0a | Services.Service.[0].Network.IPv4 |
| 0x4d | 14 | 0x07 | Services.Service.[0].Network.IPv4.DHCP |
| 0x45 | 15 | 0x04 | 0x0a02001e | Services.Service.[0].Network.IPv4.LastAddress |
| 0x4d | 17 | 0x50 | Services.Service.[1] |
| 0x4b | 0b | 0x1a | "802.15.4__18 . . . " | Services.Service.[1].ID |
| 0x4c | 0d | 0x10 | "998-3 Alp . . . " | Services.Service.[1].Name |
| 0x4c | 0f | 0x10 | 3939382d . . . | Services.Service.[1].EPANID |
| 0x45 | 10 | 0x02 | 2412 | Services.Service.[1].Frequency |
| 0x40 | 11 | 0x01 | 1 | Services.Service.[1].AutoConnect |
| 0x40 | 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric of devices to transfer data to and/or from devices having short duty cycles due to limited power (e.g., battery supplied devices). In other words, the TLV format allows flexibility of transmission while increasing compactness of the data to be transmitted.

Although the foregoing comparison of data types details how the TLV format may correspond to XML format, similar corresponding features are present when comparing the TLV format to the JSON format mentioned above. In any case, to ensure that all devices disposed within the smart-home environment 30 are capable of communicating with each other and to ensure that the cloud-computing system 64 may analyze the data received from each device in the smart-home environment 30, the cloud-computing system (e.g., remote server 142) may include a data conversion component that translates TLV-format data into JSON-format data that may be stored in appropriate buckets of information within the storage element 158.

TLV-JSON Conversion System

Figure 15:
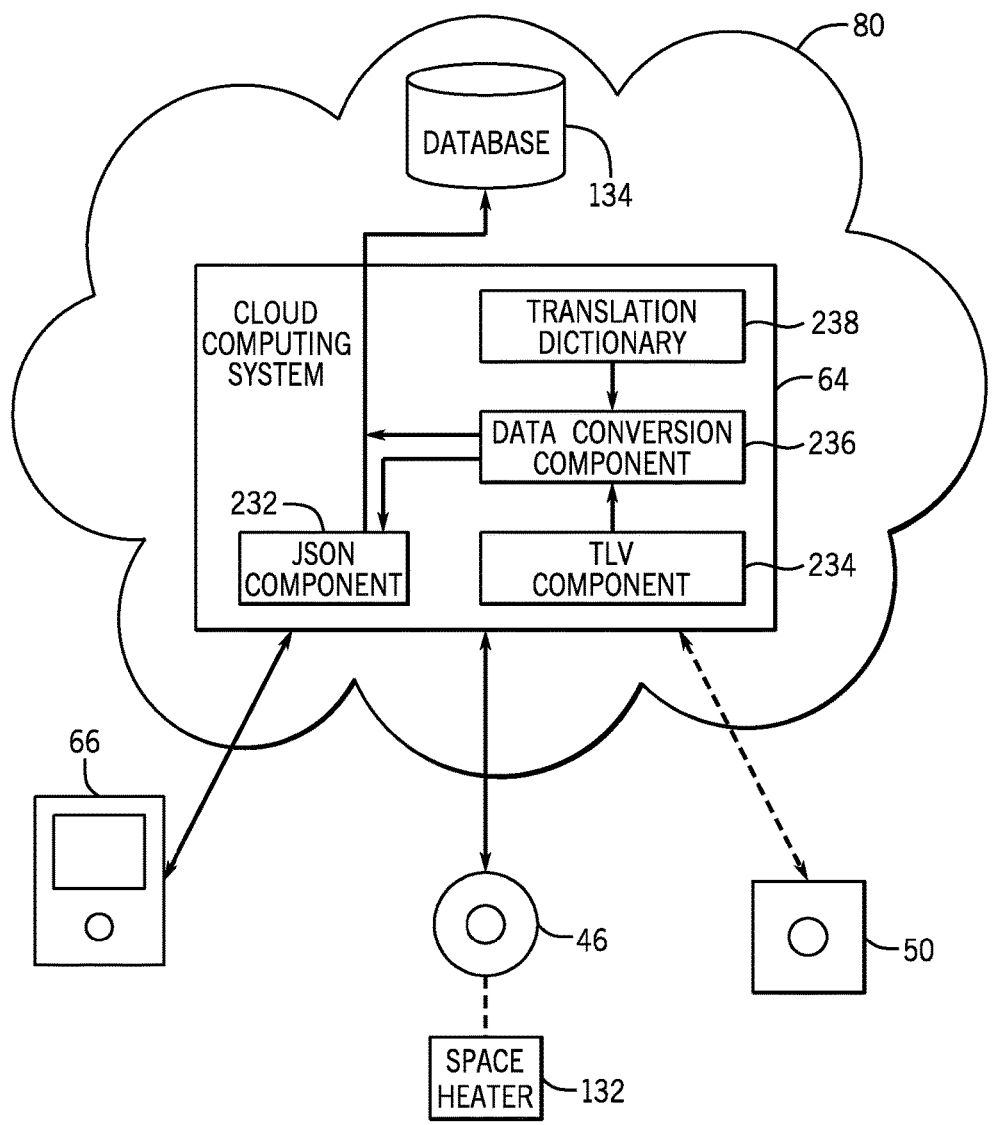
FIG. 15 illustrates a block diagram of communication system used to translate data received from various types of devices, in accordance with an embodiment.

With the foregoing discussions regarding the JSON-based communication protocol and the TLV-based communication protocol in mind, FIG. 15 illustrates a detailed view of the cloud-computing system 64 depicted in FIG. 5 with components that enable the cloud-computing system 64 to translate TLV-format data into JSON-format data. Generally, when a device, such as the thermostat 46, send an update to the cloud-computing system 64, the device may send data in the JSON-format discussed above. As such, the JSON-format data may identify a particular bucket in the database 134 and a new value to update the identified bucket of the database 134. As a result, the cloud-computing system 64 may store data received from various devices in an organized fashion, such that the stored data may be easily retrieved, analyzed, processed, and the like.

Although certain devices, such as the thermostat 46, may communicate with the cloud-computing device 64 using JSON-format data, other devices, such as the hazard detector 50, that may be part of a fabric of devices may communicate using the TLV-format data described above. As such, to update the database 134, which may be a JSON database, the cloud-computing system 64 may translate the received TLV-format data into an equivalent JSON-format data and update a corresponding bucket in the database 134 using the equivalent JSON-format data. As a result, the database 134 may be accurately updated to include a status or state of each type of JSON-enabled device and TLV-enabled device.

As mentioned above, the TLV-format data may have a one-to-one mapping to a corresponding JSON-format data. In one embodiment, this one-to-one mapping may be preserved in a translation dictionary. The translation dictionary may initially generated by identifying TLV-format data that corresponds to existing JSON-format data provided by devices such as the thermostat 46, the portable electronic device 66, and the like. The identified TLV-format data and JSON-format data pair may be stored in the translation dictionary. In one embodiment, the translation dictionary may include a one-to-one mapping for each tag of the TLV-format data and a corresponding bucket key and bucket identifier associated with an equivalent JSON-format data. The translation dictionary may also include a one-to-one mapping for each value of the TLV-format data and a corresponding bucket value associated with an equivalent JSON-format data.

Referring now to FIG. 15, to perform the translation operations discussed above, the cloud-computing system 64 may include a JSON component 232, a TLV component 234, a data conversion component 236, and a translation dictionary 238. The JSON component 232 and the TLV component 234 may be software or hardware components that receive and send JSON-format data and TLV-format data, respectively.

In certain embodiments, the thermostat 46 and the portable electronic device 66 may communicate with the cloud-computing system 64 via the JSON component 232. That is, the thermostat 46 and the portable electronic device 66 may transmit and receive data in the JSON format and the cloud-computing system 64 may transmit and receive JSON-format data via the JSON component 32. As such, each part of the data transmitted or received by the thermostat 46 and the portable electronic device 66 may include information that may be associated with some bucket. When the cloud-computing system 64 receives the JSON-format data, the cloud-computing system 64 may store the received data in a corresponding bucket in the database 134, which may correspond to the storage element 158 described above.

As such, the database 134 may include buckets of information based on the JSON-format data received from each JSON-enabled device in the smart-home environment.

In addition to receiving the JSON-format data, the cloud-computing system 64 may transmit or receive TLV-format data to or from, for example, the hazard detector 50, which may communicate using TLV-format data. In this case, the cloud-computing system 64 may employ the TLV component 234 to receive and transmit TLV-format data from and to the hazard detector 50.

Since the database 134 may store information related to all of the devices in the smart-home environment 30, the cloud-computing system 64 may employ the data conversion component 236 to convert or translate the TLV-format data received via the TLV component 234 into corresponding JSON-format data. Once translated, the corresponding JSON-format data may be used to update a corresponding bucket in the database 134.

Figure 16:
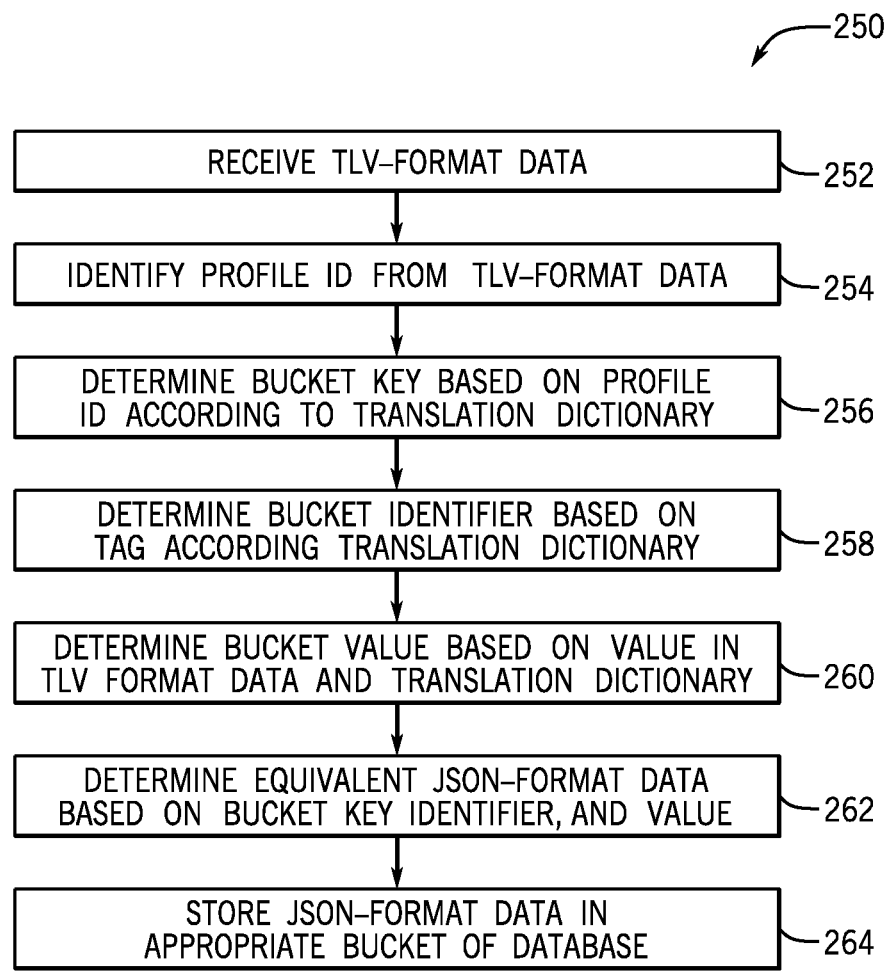
FIG. 16 illustrates a flow chart of a method for translating TLV-format data received from various devices in the smart-home environment of FIG. 2 into JSON-format data, in accordance with an embodiment.

With this in mind, FIG. 16 illustrates a flow chart of a method 250 that the data conversion component 236 may employ to translate TLV-format data received from various devices in the smart-home environment 30 into JSON-format data. Although the method 250 illustrates a particular order in which the blocks may be performed, it should be noted that the method 250 may be performed in any suitable manner and is not limited to the order presented herein.

At block 252, the data conversion component 236 may receive TLV-format data from one or more devices in the smart-home environment 30. Although the method 250 is described herein with reference to the smart-home environment 30, it should be understood that the method 250 may be employed with data received from any type of device within or outside the smart-home environment 30.

Upon receiving the TLV-format data, at block 254, the data conversion component 236 may identify a profile Id using the tag field 222 of the TLV-format data. In certain embodiments, the data conversion component 236 may also receive a vendor Id and a tag number field from the tag field 22 of the TLV-format data. In certain embodiments, the data conversion component 236 may infer the vendor Id and the profile Id based on the tag number. The vendor Id may indicate a vendor that manufactured the respective device that transmitted the TLV-format data and the profile Id may indicate a type of the device (e.g., hazard detector 50).

In any case, after determining the profile Id for the respective device, at block 256, the data conversion component 236 may determine a bucket key using the profile Id and the translation dictionary 238. As mentioned above, the translation dictionary 238 may include a mapping between the TLV-format data and an equivalent JSON-format data. In one embodiment, the translation dictionary 238 may include mappings for various possible profile Ids and corresponding bucket keys associated therewith. The bucket key may correspond to a label for a particular bucket that may be part of the database 134.

By way of example, the tag field 222 of the TLV-format data may include a hexadecimal value: "0x123" that corresponds to the profile Id. The data conversion component 236 may then use the translation dictionary 238 to determine a bucket key that corresponds to the profile Id received via the tag field 222 of the TLV-format data.

At block 258, the data conversion component 236 may determine a bucket identifier using an instance Id specified in the tag field 222 and the translation dictionary 238. As such, the data conversion component 236 may use the translation dictionary 238 to determine an equivalent bucket identifier that corresponds to the instance Id. The bucket identifier may be used to determine a particular instance of the bucket identified at block 254.

After identifying a particular bucket key and bucket identifier that corresponds to the received TLV-format data, the data conversion component 236 may, at block 260, determine a bucket value based on a value provided in the value field 226 of the TLV-format data. In one embodiment, the value in the value field 226 may directly correspond to a value that may be used to update the identified bucket. For example, if the hazard detector 50 provides TLV-format data that includes a 1 to indicate that a hazard is present and a 0 to indicate that a hazard is not present, the data conversion component 236 may then use the same 1 or 0 to update the identified bucket. That is, the data conversion component 236 may use the value of the value field 226 to update a value of the identified bucket.

In certain embodiments, however, certain values may not properly translate based on the value of the value field 226. For example, the TLV-format data associated with occupancy information (e.g., whether a living being is present in the smart-home environment 30) may include values 1, 0, or −1, which may represent occupied, not occupied, and unknown, respectively. Here, the negative value, −1, may not have an equivalent value representation in the JSON-format data. That is, JSON-format data may not include negative values. In this case, the translation dictionary 238 may include a mapping for certain values that may be part of the TLV-format data but may not have an equivalent JSON-format representation. For instance, the translation dictionary 238 may include a mapping that associates the occupied state, 1, in the TLV-format data with a two-bit value 01, a mapping that associates the unoccupied state, 0, in the TLV-format data with a two-bit value 00, and a mapping that associates the unknown occupied state, −1, in the TLV-format data with a two-bit value 11. The mapped two-bit values may thus be used to update appropriate buckets in the database 134.

Keeping the foregoing in mind, the translation dictionary 238 may include custom mappings between values that may be represented in the TLV-format data and corresponding values in the JSON-format data. In certain embodiments, the translation dictionary 238 may be updated as values in the TLV-format data are identified as not having equivalent JSON-format data representations. In the same manner, the translation dictionary 238 may be updated as new profile Ids, instance Ids, and the like associated with the tag field 222 is identified. In one embodiment, the translation dictionary 238 may be updated manually. That is, the translation dictionary 238 may be updated by new manufacturers (e.g., third-party devices) as new entries for the tag field 222 or the value field 226 are created for the respective new device.

Although JSON-format data includes some equivalent representation for most types of values specified in the TLV-format data, JSON-format data is not capable of representing a byte string or byte array, while the TLV-format data may include data in the value field 226 as a byte string or byte array. As such, if the TLV-format data received via the TLV component 234 is expected to include a packed binary data such as a byte string, the translation dictionary 238 may include a custom translation or mapping that may be used to determine an equivalent bucket value that may be used to encode the JSON-format data. In one embodiment, when receiving a byte string of the TLV-format data, if the translation dictionary 238 does not provide a respective mapping for the respective byte string, the data conversion component 236 may just receive the byte stream before encoding the translated portions of the TLV-format data with corresponding JSON-format data. In another embodiment, the cloud-computing system 64 may receive each portion of the byte string and update the corresponding bucket using an anonymous tag for each portion of the byte string. The anonymous tag may denote that the received data is part of a byte string and thus may be associated with an appropriate byte string.

Referring back to FIG. 16, at block 262, the data conversion component 236 may encode the bucket key, the bucket identifier, and bucket value determined from blocks 254, 258, and 260 as JSON-format data. At block 264, the data conversion component 236 may then store the JSON-format data in an appropriate location of the database 134. In certain embodiments, the data conversion component 236 may provide the JSON-format data to the JSON component 232, which may then properly update respective buckets in the database 134 based on the JSON-format data. In another embodiment, the data conversion component 236 may identify the bucket that corresponds to the JSON-format data and update the respective buckets accordingly. In yet another embodiment, the data conversion component 236 may update the database 134 while determining the bucket key, the bucket identifier, and bucket value at blocks 254, 258, and 260.

After the database 134 and the respective buckets of the database 134 are updated, the cloud-computing system 64 may have access to current data regarding all of the devices of the smart-home environment 30 in one interpretable format. As such, the cloud-computing system 64 may effectively manage the operations of each of the devices in the smart-home environment 30 based on the conditions of each respective device. Moreover, subscription services provided by the cloud-computing system 64 may perform their respective operations based on up to date data regarding each of the devices in the smart-home environment 30. Additionally, when analyzing the aggregated data related to the smart-home environment 30, the cloud-computing system 64 may perform analysis operations using various data analysis tools without performing any further data translation operations. As a result, the cloud-computing system 64 may efficiently analyze the data of the database 134 and efficiently manage the respective operations of the devices of the smart-home environment 30.

After analyzing the data of the database 134, the cloud-computing system 64 may then send commands to various devices of the smart-home environment 60 based on the results of the analysis. In certain embodiments, the cloud-computing system 64 may send JSON-format data or TLV-format data to the respective devices. As such, if the cloud-computing system 64 attempts to update a device that communicates using TLV-format data with data from the database 134, the cloud-computing system 64 may translate the JSON-format data from the database 134 into TLV-format data using the translation dictionary 238. The cloud-computing system 64 may then send the TLV-format data to the respective device, such that the respective device may update its respective data.

Although the method 250 of FIG. 16 is described as being performed by the cloud-computing system 64, it should be noted that the method 250 may be performed by other devices that also include one or more processors. For example, the methods described herein may also be performed by any type of device 10 that may be employed in the smart-home environment 30 or the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system comprising:
    a first set of devices configured to control or monitor conditions in a home environment and communicate with each other using a tag-length-value (TLV) data format;
    a second set of devices configured to control or monitor conditions in the home environment and communicate with each other using a JavaScript Object Notation (JSON) data format;
    a storage element configured to store information associated with the first and second sets of devices in the JSON data format; and
    a cloud-computing device configured to update the storage element by performing operations including:
        receiving a first set of data from the first set of devices;
        translating the first set of data into a second set of data having the JSON data format, including:
            identifying a profile identification associated with a tag field in the first set of data, and
            determining a bucket key that corresponds to the profile identification based on a translation dictionary; and
        storing the second set of data in the storage element.

2. The system of claim 1, wherein the translation dictionary comprises a plurality of mappings between a first plurality of fields represented in the TLV format data to a second plurality of fields represented in the JSON format data.

3. The system of claim 2, wherein the plurality of mappings is input into the translation dictionary as a customized mapping.

4. The system of claim 1, wherein the profile identification corresponds to a type of device.

5. The system of claim 4, wherein the type of device comprises a thermostat, a hazard detector, or a portable electronic device.

6. The system of claim 1, wherein the bucket key corresponds to a bucket associated with the storage element.

7. The system of claim 1, wherein the cloud-computing device is configured to translate the first set of data into the second set of data by performing operations including:
    identifying an instance identification associated with the tag field in the first set of data; and
    determining a bucket identifier that corresponds to the instance identification based on the translation dictionary, wherein the bucket identifier corresponds to an instance of a bucket associated with the storage element.

8. The system of claim 1, wherein the cloud-computing device is configured to translate the first set of data into the second set of data by performing operations including:
    identifying a value associated with a value field in the first set of data; and
    determining a bucket value that corresponds to the value based on the translation dictionary.

9. A non-transitory computer-readable medium comprising instructions configured to:
    receive JavaScript Object Notation (JSON) format data, from a first device, relating to a monitored or controlled first condition in a building environment;

receive tag-length-value (TLV) format data, from a second device, relating to a monitored or controlled second condition in the building environment;

update a first bucket in a storage element based on the JSON format data;

translate the TLV-format data into equivalent JSON format data, the instructions for the translation including:
 identifying a profile identification associated with a tag field in the TLV-format data, and
 determining a bucket key that corresponds to the profile identification based on a translation dictionary; and update a second bucket in the storage element based on the equivalent JSON format data.

10. The non-transitory computer-readable medium of claim 9, wherein the first bucket and the second bucket comprises information organized in a field-value pair.

11. The non-transitory computer-readable medium of claim 9, wherein the instructions configured to translate the TLV-format data into the equivalent JSON-format data includes using data represented in a value field of the TLV-format data as a bucket value in the equivalent JSON-format data.

12. The non-transitory computer-readable medium of claim 9, wherein the instructions configured to translate the TLV-format data into the equivalent JSON-format data includes translating data represented in a value field of the TLV-format data into a bucket value in the equivalent JSON-format data based on a mapping indicated in a translation mapping.

13. The non-transitory computer-readable medium of claim 9, wherein the profile identification corresponds to a type of device.

14. A method comprising:
receiving, via at least one processor, tag-length-value (TLV) format data from a first device operating in a structure;

translating the TLV format data into equivalent JavaScript Object Notation (JSON) format data that is interpretable by a second device operating in the structure, the TLV format data and the equivalent JSON format data being associated with a first portion of information associated with occupancy properties of the structure, the translating comprising:
 identifying a profile identification associated with a tag field in the TLV format data, and
 determining a bucket key that corresponds to the profile identification based on a translation dictionary; and storing the equivalent JSON format data in a storage element comprising a second portion information associated with the occupancy properties of the structure.

15. The method of claim 14, wherein the translating the TLV format data into the equivalent JSON format data comprises identifying an equivalent representation of the TLV format data in JSON format using the translation dictionary comprising information regarding one or more relationships between the TLV format data and the JSON format data.

16. The method of claim 15, wherein the translation dictionary comprises a mapping between a first plurality of fields associated with the TLV format data and a second plurality of fields associated with the JSON format data.

17. The method of claim 14, wherein the storing the equivalent JSON format data in the storage element comprises:
determining a bucket key that corresponds to one of a plurality of buckets of information stored within the storage element based on the equivalent JSON format data, wherein the bucket key is configured to identify the one of the plurality of buckets of information;

determining a bucket identifier that corresponds to an instance of the one of the plurality of buckets of information based on the equivalent JSON format data; and writing a bucket value into the one of the plurality of buckets of information based on the equivalent JSON format data.

18. The method of claim 14, further comprising sending the equivalent JSON format data to the second device.

19. The method of claim 14, wherein the profile identification corresponds to a type of device.

20. The method of claim 19, wherein the type of device comprises a thermostat, a hazard detector, or a portable electronic device.

* * * * *